US008493613B2

(12) United States Patent
Kaima

(10) Patent No.: US 8,493,613 B2
(45) Date of Patent: Jul. 23, 2013

(54) APPARATUS AND METHOD CONTROLLING ZOOMING PROCESS AT LASER DEVICE FOR HIGH-SPEED HIGH-RESOLUTION DOUBLE-SIDED PRINTING WITHOUT WIDE-RANGED IMAGE DEGRADATION OR BANDING

(75) Inventor: Nobuyoshi Kaima, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 796 days.

(21) Appl. No.: 12/721,012

(22) Filed: Mar. 10, 2010

(65) Prior Publication Data
US 2010/0231940 A1    Sep. 16, 2010

(30) Foreign Application Priority Data

Mar. 11, 2009    (JP) .................. 2009-058652

(51) Int. Cl.
H04N 1/393    (2006.01)
H04N 1/58    (2006.01)
G06K 15/12    (2006.01)
B41J 2/47    (2006.01)

(52) U.S. Cl.
CPC .......... *H04N 1/3935* (2013.01); *G06K 15/1219* (2013.01); *G06K 15/1223* (2013.01); *B41J 2/473* (2013.01)
USPC ........... 358/1.2; 358/1.7; 358/3.24; 358/3.26; 347/233

(58) Field of Classification Search
USPC ............... 358/1.2, 1.7, 1.9, 3.26, 504, 528, 358/406, 451, 3.24; 347/233, 234, 116, 118; 399/196, 197
See application file for complete search history.

(56) References Cited

U.S. PATENT DOCUMENTS

| 7,843,604 | B2* | 11/2010 | Higashiyama et al. | ........ 358/1.9 |
| 8,159,722 | B2* | 4/2012 | Higashiyama et al. | ...... 358/3.26 |
| 8,305,637 | B2* | 11/2012 | Shinohara | ...................... 358/1.9 |
| 8,320,024 | B2* | 11/2012 | Kawai et al. | ................ 358/3.26 |
| 8,384,958 | B2* | 2/2013 | Kondoh | ................... 358/3.26 |
| 2008/0309951 | A1 | 12/2008 | Kishi et al. | |
| 2009/0066981 | A1 | 3/2009 | Kaima et al. | |
| 2009/0213401 | A1* | 8/2009 | Higashiyama et al. | ........ 358/1.9 |
| 2009/0231606 | A1* | 9/2009 | Kawai et al. | .................. 358/1.9 |
| 2010/0231940 | A1* | 9/2010 | Kaima | ........................... 358/1.9 |
| 2010/0253981 | A1* | 10/2010 | Higashiyama et al. | ...... 358/3.26 |
| 2011/0222085 | A1* | 9/2011 | Takesue et al. | ................ 358/1.9 |
| 2012/0140013 | A1* | 6/2012 | Komai et al. | ................. 347/118 |
| 2012/0147116 | A1* | 6/2012 | Kinoshita et al. | ............ 347/118 |

FOREIGN PATENT DOCUMENTS

| JP | 3373266 | 11/2002 |
| JP | 2009-83472 | 4/2009 |

* cited by examiner

Primary Examiner — Scott A Rogers
(74) Attorney, Agent, or Firm — Oblon, Spivak, McClelland, Maier & Neustadt, L.L.P.

(57) ABSTRACT

An image forming apparatus includes a positioning unit that acquires a misalignment amount of a pixel in a main-scanning direction and a sub-scanning direction, the pixel as a reference pixel for zooming image data, and decides a position of a pixel as a correction target, based on the misalignment amount; a correcting unit that corrects the pixel; a zooming unit that controls the positioning unit and the correcting unit so as to repeatedly perform the positioning process and the correction process on a pixel line; a pattern recognition unit that performs pattern matching on a predetermined pattern and a predetermined pixel line; and a pixel position changing unit that shifts the decided pixel position in the sub-scanning direction, wherein the zooming unit performs the zooming process on the pixel line of the sub-scanning direction including the pixel that is located at shifted pixel position.

8 Claims, 19 Drawing Sheets

FIG. 7A
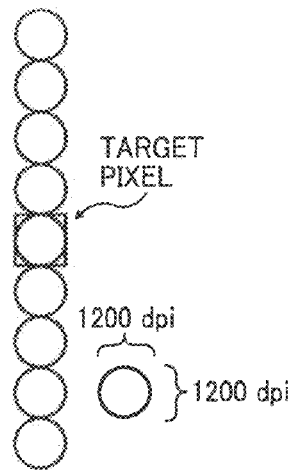
FIG. 7B
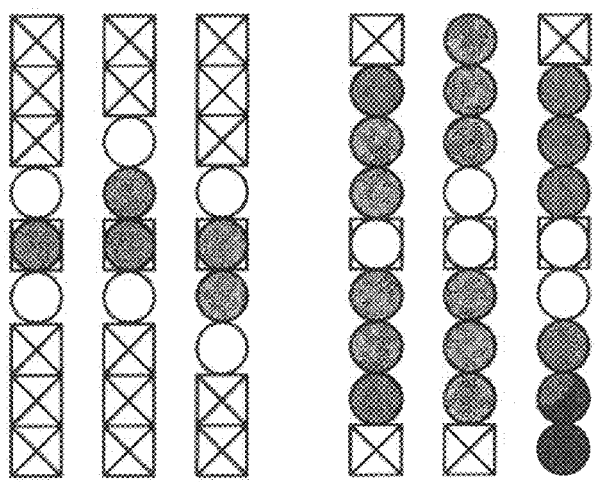
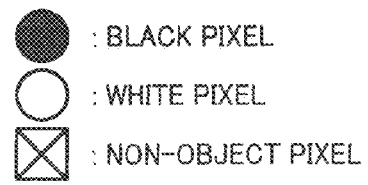
WHEN match=0, THERE IS NO PATTERN MATCHING

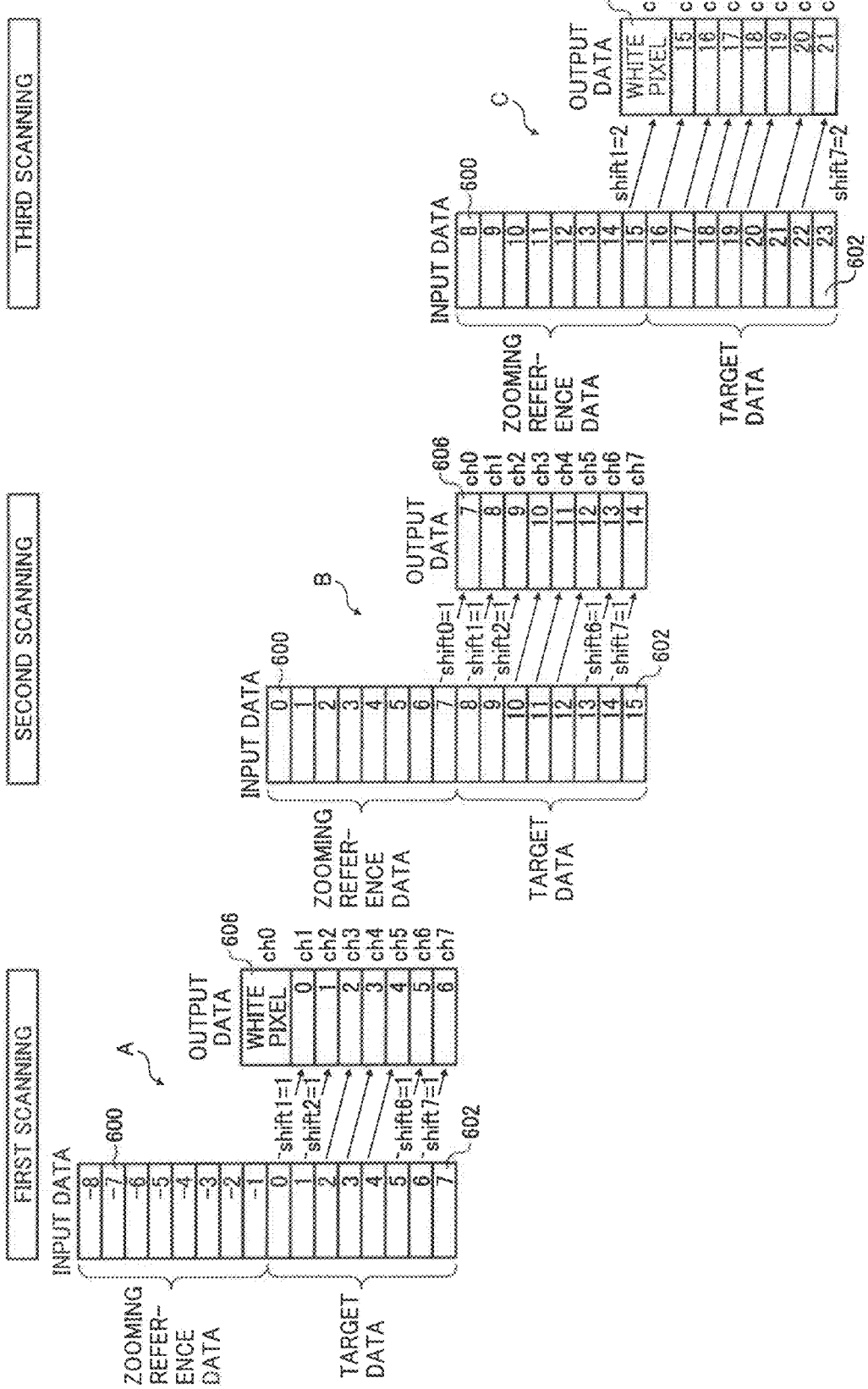

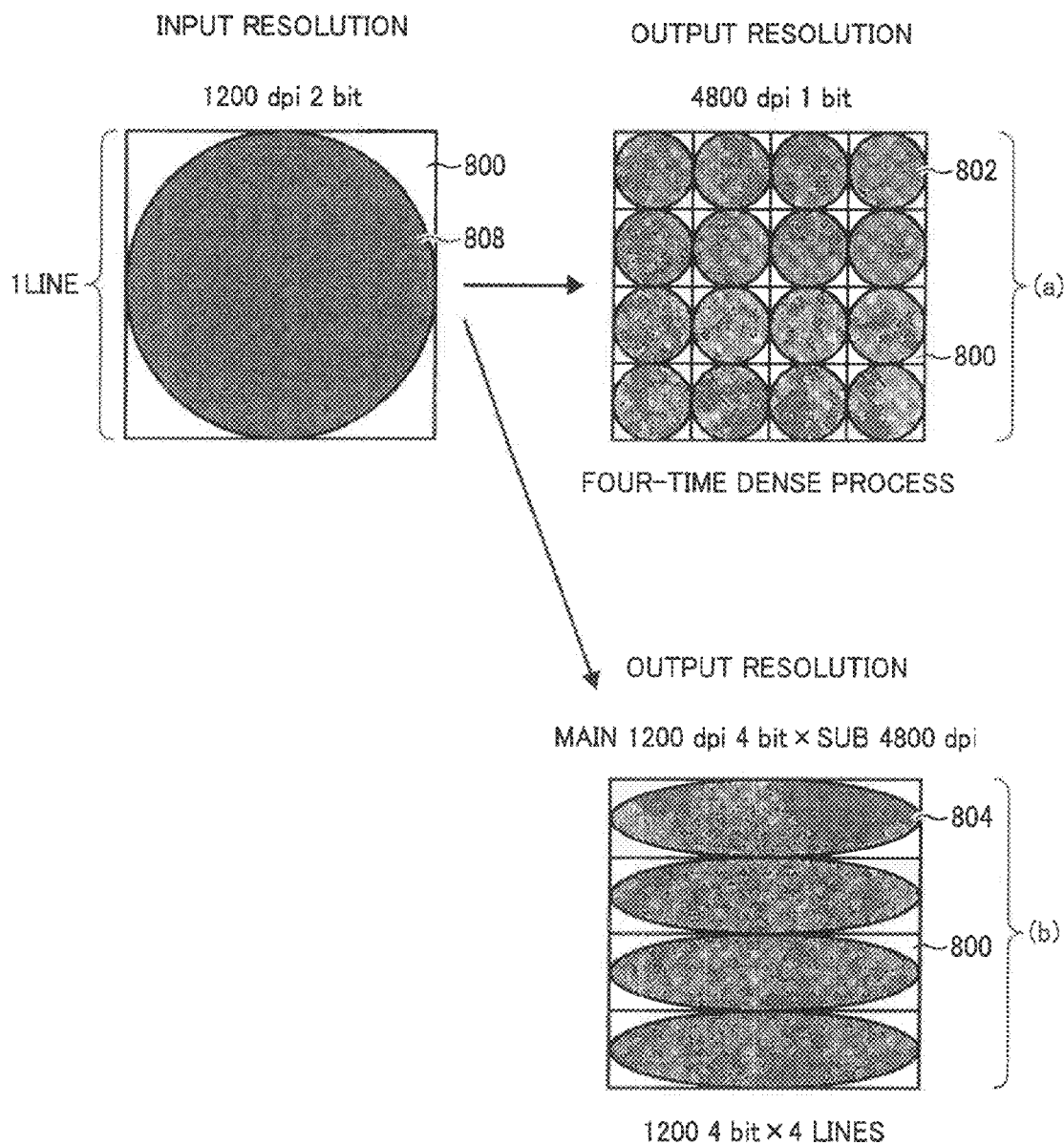

FIG. 15
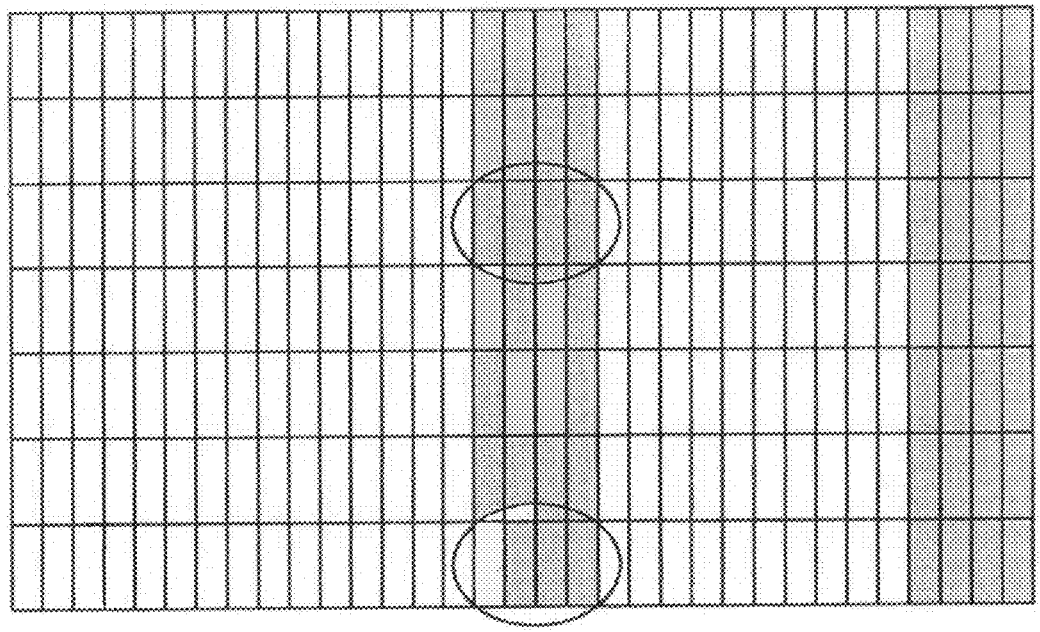
CORRECTION
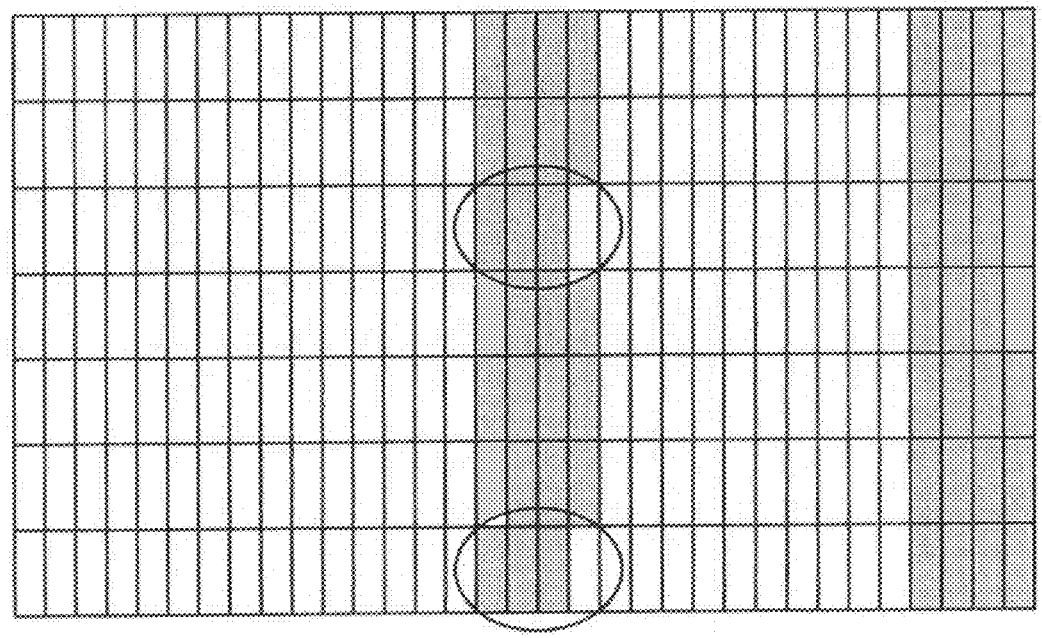

APPARATUS AND METHOD CONTROLLING ZOOMING PROCESS AT LASER DEVICE FOR HIGH-SPEED HIGH-RESOLUTION DOUBLE-SIDED PRINTING WITHOUT WIDE-RANGED IMAGE DEGRADATION OR BANDING

CROSS-REFERENCE TO RELATED APPLICATIONS

The present application claims priority to and incorporates by reference the entire contents of Japanese Patent Application No. 2009-058652 filed in Japan on Mar. 11, 2009.

BACKGROUND OF THE INVENTION

1. Field of the Invention

The present invention relates to image forming. More particularly, the present invention relates to an image forming apparatus and an image forming method that form a multi-beam latent image.

2. Description of the Related Art

Along with the improvement of function of an image forming apparatus, an image forming speed (PPM: prints per minutes) per a unit time of the image forming apparatus also increases. In recent years, an image forming apparatus that utilizes a surface emitting laser (hereinafter, VCSEL (Vertical Cavity Surface Emitting LASER)) to perform multi-beam exposure is proposed to form an image at higher speed and with higher resolution. Moreover, an image forming apparatus that performs duplex printing is provided in response to the request of resource saving.

For this reason, along with the improvement of an imaging speed, an automatic duplex printing apparatus has a trend that a time interval from the record of the first surface to the record of the second surface of paper is shortened. For example, a high-speed model can perform the print of the first surface and the print of the second surface within ten seconds. Because a carrying distance from heat fixing corresponding to the record of the first surface of paper to the record of the second surface is likely to be shortened in conjunction with the miniaturization of the image forming apparatus, a time for which the paper is not exposed to a high-temperature portion is shortened. Besides a time interval, printing paper further comes under thermal influence and thus is hard to get cold.

When two-sided recording is performed in such a situation, it is known that images that are printed on the first and second surfaces, which are both sides of paper, have the difference of magnification of 0.2% to 0.4% due to the change of heat and moisture when a sheet of premium grade paper having the thickness of about 80 micrometers is used as printing paper.

In regard to the problem described above, a technology for providing a sub-scanning magnification zooming function to an image forming apparatus, and performing reduction print by the thinning of sub-scanning image data and expansion print by the addition of image data have been conventionally known as disclosed in, for example, Japanese Patent No. 3373266.

The fluctuation of magnification might be able to be cancelled by the method disclosed in Japanese Patent No. 3373266. However, along with the high resolution of an image to be formed, a periodic image that forms, for example, one line in every five lines has problem occurring globally such image defect as concentration unevenness or moire when a single line is thinned or added from or to the image for correcting the fluctuation of magnification.

Moreover, it is necessary to prevent banding caused by the number of screen lines, the interference of the magnification, and the like along with the cancellation process of the fluctuation of magnification.

SUMMARY OF THE INVENTION

It is an object of the present invention to at least partially solve the problems in the conventional technology.

According to an aspect of the present invention, there is provided an image forming apparatus including: a positioning unit configured to acquire a misalignment amount of a pixel in a main-scanning direction and a misalignment amount of the pixel in a sub-scanning direction from a position of the main-scanning direction, the pixel being used as a reference pixel for zooming image data, and the image data being consisted of a plurality of pixels, and to decide a position of a pixel, the pixel being to be a correction target, as a target pixel based on the misalignment amount in the main-scanning direction and on the misalignment amount in the sub-scanning direction, as a positioning process; a correcting unit configured to correct the pixel located at the pixel position, as a correction process; a zooming unit configured to control the positioning unit and the correcting unit for zooming the image data so as to repeatedly perform the positioning process and the correction process on a pixel line of the sub-scanning direction including the pixel located at the pixel position and to repeatedly perform the positioning process and the correction process, which are performed on the pixel line of the sub-scanning direction, in the main-scanning direction, as a zooming process; a pattern recognition unit configured to perform pattern matching on a predetermined pattern and a predetermined pixel line of the image data; and a pixel position changing unit configured to shift the decided pixel position in the sub-scanning direction, when the pixel line of the sub-scanning direction including the pixel of the pixel position decided by the positioning unit is identical with the pattern, wherein the zooming unit performs the zooming process on the pixel line of the sub-scanning direction including the pixel that is located at shifted pixel position shifted by the pixel position changing unit.

According to anther aspect of the present invention, there is provided an image forming apparatus including: a pattern recognition unit configured to perform pattern matching between a predetermined pattern and a predetermined pixel line of image data consisting of a plurality of pixels; a positioning unit configured to performs a positioning process for deciding a position of a pixel that is to be a correction target based on a position of a main-scanning direction of a pixel that becomes a reference pixel for zooming the image data, on a misaligned amount in a sub-scanning direction from the position of the main-scanning direction, and on a result of the pattern matching; a correcting unit configured to correct the pixel located at the pixel position, as a correction process; and a zooming unit configured to control the positioning unit and the correcting unit to perform a zooming process for zooming the image data so as to repeatedly perform the positioning process and the correction process on a pixel line of the sub-scanning direction including the pixel located at the pixel position and to repeatedly perform the positioning process and the correction process, which are performed on the pixel line of the sub-scanning direction, in the main-scanning direction.

According to still another aspect of the present invention, there is provided an image forming method in an image forming apparatus, the image forming method including: acquiring a misalignment amount of a pixel in a main-scanning direction and a misalignment amount of the pixel in a sub-scanning direction from a position of the main-scanning direction, the pixel being used as a reference pixel for zooming image data, and the image data being consisted of a plurality of pixels by a positioning unit; deciding a position of a pixel, the pixel being to be a correction target, as a target pixel based on the misalignment amount in the main-scanning direction and on the misalignment amount in the sub-scanning direction, as a positioning process by the positioning unit; correcting the pixel located at the pixel position, as a correction process by a correcting unit; controlling the positioning unit and the correcting unit for zooming the image data so as to repeatedly perform the positioning process and the correction process on a pixel line of the sub-scanning direction including the pixel located at the pixel position and to repeatedly perform the positioning process and the correction process, which are performed on the pixel line of the sub-scanning direction, in the main-scanning direction, as a zooming process by a zooming unit; performing pattern matching on a predetermined pattern and a predetermined pixel line of the image data by a pattern recognition unit; and shifting the decided pixel position in the sub-scanning direction, when the pixel line of the sub-scanning direction including the pixel of the pixel position decided by the positioning unit is identical with the pattern by a pixel position changing unit, wherein the zooming includes performing the zooming process on the pixel line of the sub-scanning direction including the pixel that is located at shifted pixel position shifted by the pixel position changing unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7A is a schematic diagram illustrating an example of an image matrix;

FIG. 7B is a schematic diagram illustrating a pattern example of a recognizing pixel column;

FIG. 10B is a diagram illustrating an operation example (a first scan to a third scan) of the image path selector when a pixel bit is appended;

FIG. 12 is a diagram illustrating an example of a case where four-time dense image data is generated in a main-scanning direction and a sub-scanning direction, or four-time dense image data is generated only in a sub-scanning direction;

FIG. 15 is an explanation diagram illustrating an example of an image that is obtained by performing a zooming process on the addition/deletion position before position correction, and the addition/deletion position after position correction of a pixel;

DETAILED DESCRIPTION OF THE PREFERRED EMBODIMENTS

Exemplary embodiments of the present invention will be explained in detail below with reference to the accompanying drawings. However, the present invention is not limited to these embodiments.

Figure 1:
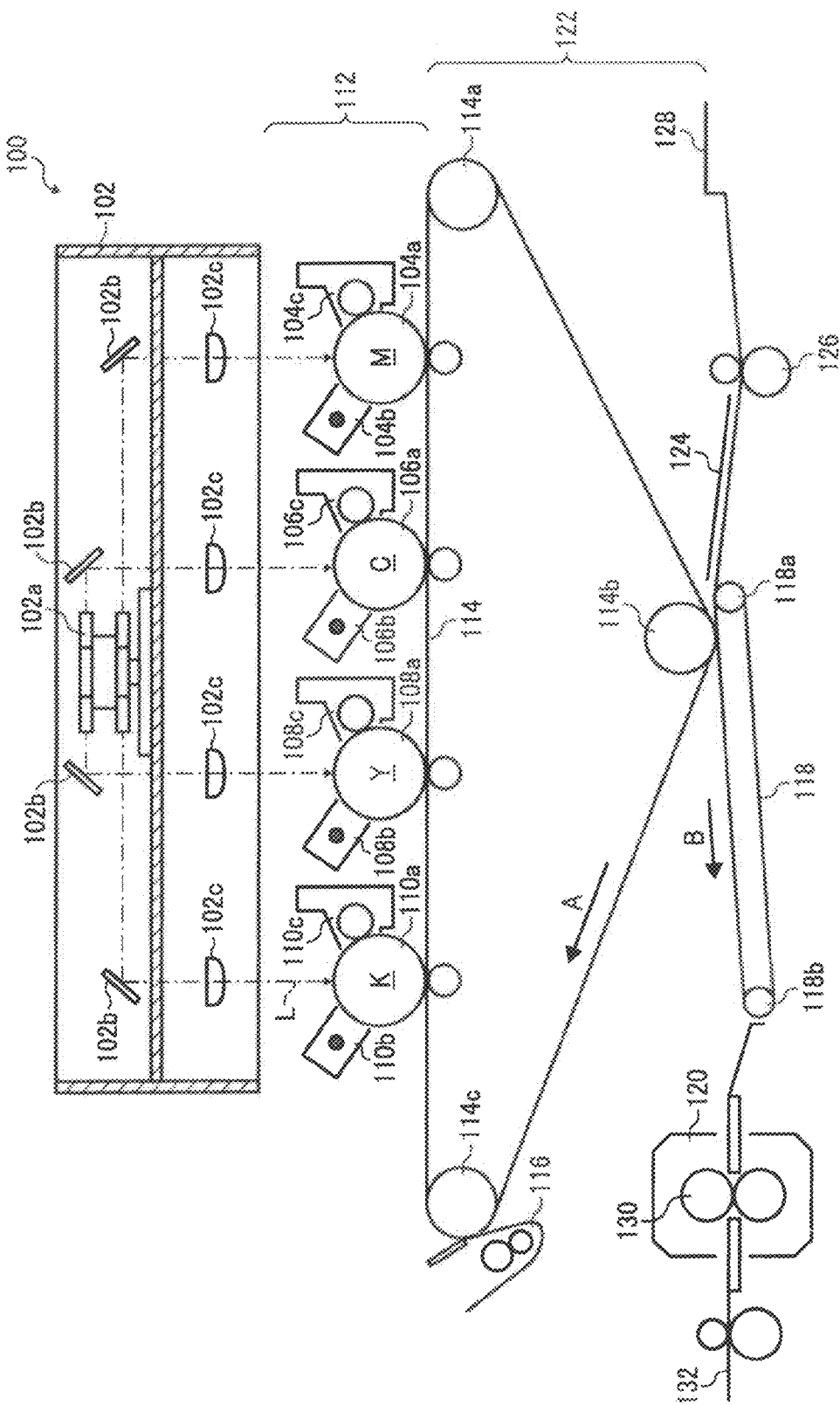
FIG. 1 is a diagram illustrating an embodiment of an image forming apparatus.

FIG. 1 is a schematic diagram illustrating mechanical configuration of an image forming apparatus 100 according to a first embodiment. The image forming apparatus 100 of the present embodiment includes an optical device 102 including optical elements such as a VCSEL (Vertical Cavity Surface Emitting LASER) 200 (see FIG. 2 and FIG. 3) or a polygon mirror 102a, an image forming unit 112 including a photo conductor drum, a charging device, a developing device, and the like, and a transfer unit 122 including an intermediate transfer belt and the like. The optical device 102 includes the VCSEL 200 as a semiconductor laser. In the embodiment illustrated in FIG. 1, light beams projected from the VCSEL 200 (not illustrated in FIG. 1) are once condensed by a first cylindrical lens (not illustrated) and are deflected by the polygon mirror 102a to a reflecting mirror 102b.

Figure 2:
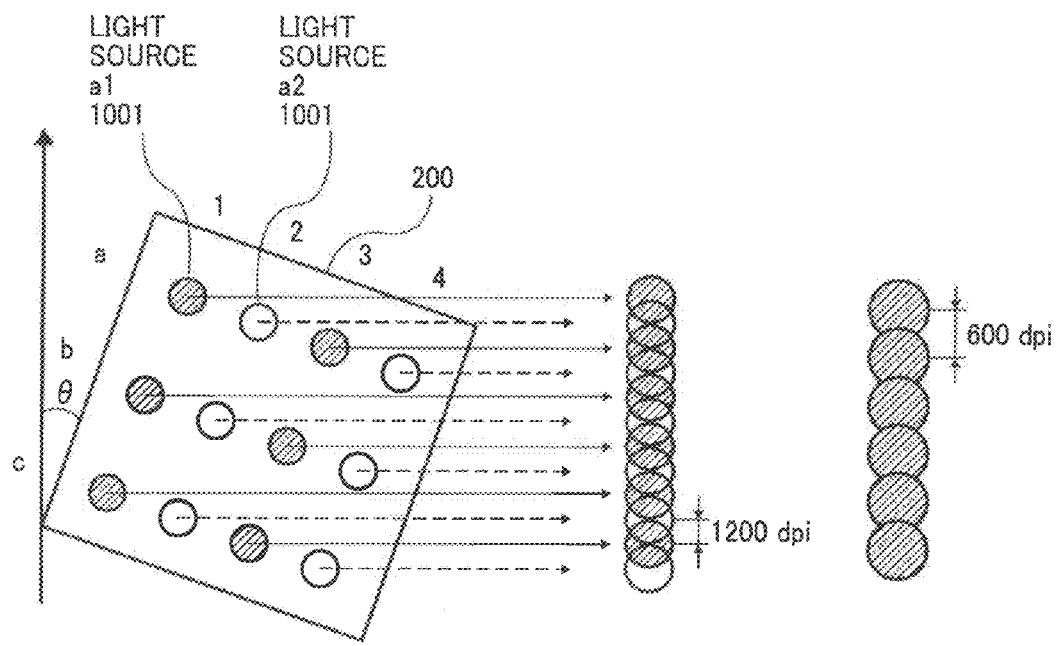
FIG. 2 is a diagram illustrating an example of a case where a light source unit consists of a semiconductor laser array or a surface emitting laser.

The VCSEL 200 is a plane-emission semiconductor laser in which a plurality of light sources (semiconductor lasers) is arranged on a same chip in a reticular pattern. There are known various technologies for an image forming apparatus that employs the VCSEL 200. The optical device 102 of the image forming apparatus 100 according to the present embodiment includes the VCSEL 200 by employing the configuration similar to these well-known technologies. FIG. 2 is a configuration diagram of the VCSEL 200 that is incorporated in the optical device 102 of the present embodiment. As illustrated in FIG. 2, the VCSEL 200 of the present embodiment constitutes a semiconductor laser array in which a plurality of light sources 1001 (a plurality of semiconductor lasers) are arranged in a reticular pattern. In this case, the plurality of light sources 1001 are provided in such a manner that their array directions are inclined against the rotation axis of the polygon mirror 102a, which functions as a deflector, at a predetermined angle θ.

In FIG. 2, it is assumed that the vertical array direction of the light source is "a" to "c" and the transversal array direction thereof is "1" to "4". For example, the light source 1001 illustrated at an upper-left side of FIG. 2 is indicated as "a1". Because the light sources 1001 are arranged to be inclined at a polygon mirror angle θ, a light source a1 and a light source a2 expose different scanning positions. It is considered that one pixel is constituted by the two light sources, in other words, one pixel is realized by two light sources in FIG. 2. For example, assuming that the two light sources a1 and a2 constitute one pixel, and two light sources a3 and a4 constitute one pixel, pixels as illustrated in the right-hand edge of FIG. 2 are formed by the light sources illustrated in the diagram. When it is assumed that the vertical (longitudinal) direction of the diagram is a sub-scanning direction, it is assumed that the center distance of pixels constituted by two light sources corresponds to 600 dpi. At this time, an interval between centers of two light sources constituting one pixel corresponds to 1200 dpi. Thus, a light-source density has a two-time density as compared with one single pixel density. Therefore, the barycenter position of a pixel can be shifted in a sub-scanning direction, and high-accuracy image forming can be realized by changing the light amount ratio of light sources constituting one pixel.

The image forming apparatus 100 includes the post-object type optical device 102 that does not use an fθ lens. In the illustrated embodiment, light beams L are generated by a quantity corresponding to all colors of cyan (C), magenta (M), yellow (Y), and black (K), are reflected by the reflecting mirror 102b, are again condensed by a second cylindrical lens 102c, and then exposes photo conductor drums 104a, 106a, 108a, and 110a.

Because the irradiations of the light beams L are performed by using the plurality of optical elements as described above, timing synchronizations are performed with respect to a main-scanning direction and a sub-scanning direction. Hereinafter, a main-scanning direction is defined as the scanning direction of light beam and a sub-scanning direction is defined as a direction perpendicular to the main-scanning direction.

Each of the photo conductor drums 104a, 106a, 108a, and 110a includes a photoconductive layer that has at least a charge generating layer and a charge transporting layer on a conductive drum such as aluminum. The photoconductive layers are respectively arranged in correspondence with the photo conductor drums 104a, 106a, 108a, and 110a. Surface charges are given to the photoconductive layers by charging devices 104b, 106b, 108b, and 110b of which each includes a corotron, scorotron, or a charged roller.

Electrostatic charges that are given by the charging devices 104b, 106b, 108b, and 110b on the photo conductor drums 104a, 106a, 108a, and 110a are exposed by the light beams L to form an image and thus an electrostatic latent image is formed. The electrostatic latent image formed on the photo conductor drums 104a, 106a, 108a, and 110a is developed by developing devices 104c, 106c, 108c, and 110c including a developing sleeve, a developer supplying roller, a regulatory blade, and the like so that a developer image is formed.

The each developer carried on each of the photo conductor drum 104a, 106a, 108a, and 110a is transferred on an intermediate transfer belt 114 that moves in the direction of an arrow A by carrying rollers 114a, 114b, and 114c. The intermediate transfer belt 114 is carried to a secondary transfer unit in a state where the intermediate transfer belt is carrying C, M, Y, and K developer. The secondary transfer unit includes a secondary transfer belt 118 and carrying rollers 118a and 118b. The secondary transfer belt 118 is carried in the direction of an arrow B by the carrying rollers 118a and 118b. The secondary transfer unit is supplied with an image receiving member 124 such as premium grade paper or plastic sheet from an image-receiving-member accommodating unit 128, which is a paper feeding cassette by using a carrying roller 126.

The secondary transfer unit applies a secondary transfer bias to transfer a multicolor developer image carried on the intermediate transfer belt 114 to the image receiving member 124 that is adsorbed and held on the secondary transfer belt 118. The image receiving member 124 is supplied to a fixing device 120 along with the transportation of the secondary transfer belt 118. The fixing device 120 includes a fixing member 130 such as a fixing roller including silicone rubber, fluorine rubber, or the like. The fixing device 120 pressurizes and heats the image receiving member 124 and the multicolor developer image and outputs the heated member to the outside of the image forming apparatus 100 as a printed matter 132. The intermediate transfer belt 114 after transferring the multicolor developer image is supplied to the next image formation process after post-transfer remaining developer is removed by a cleaning unit 116 including a cleaning blade.

Figure 3:
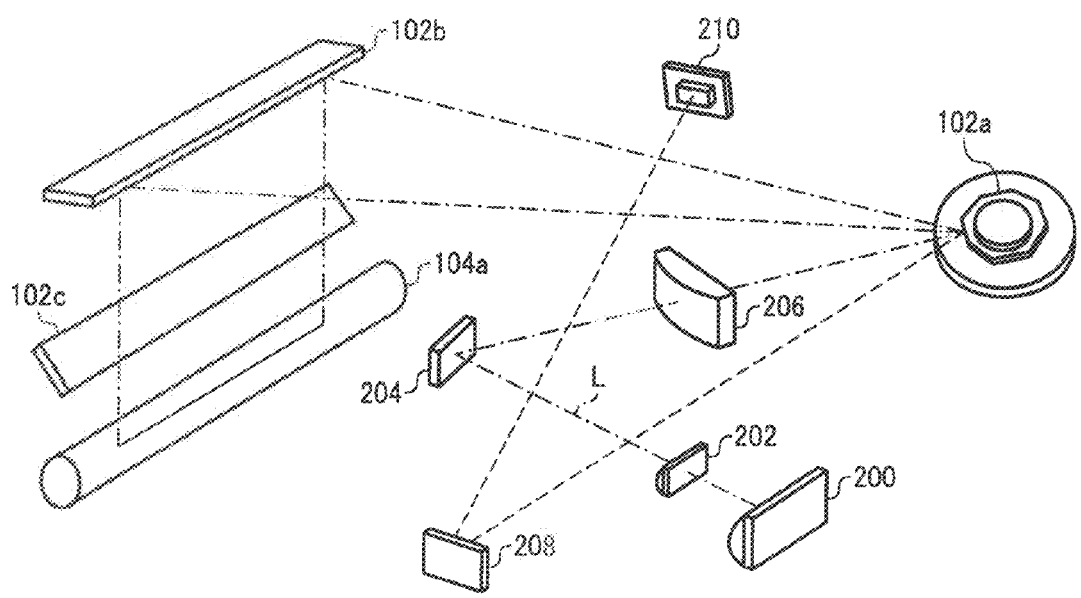
FIG. 3 is a schematic perspective diagram illustrating a case where an optical device including VCSEL exposes a photo conductor drum.

FIG. 3 is a schematic perspective diagram illustrating the configuration where the optical device 102 including the VCSEL 200 exposes the photo conductor drum 104a. The light beams L projected from the VCSEL 200 are condensed by a first cylindrical lens 202 that is used to shape the bundle of light beams, pass through a reflecting mirror 204 and an imaging lens 206, and then are deflected by the polygon mirror 102a. The polygon mirror 102a is driven to rotate by a spindle motor or the like that rotates at several thousand to several ten-thousand rotations. The light beams L reflected by the polygon mirror 102a are again reflected by the reflecting mirror 102b and then are reshaped by the second cylindrical lens 102c to expose an upper surface of the photo conductor drum 104a.

Moreover, a reflecting mirror 208 is arranged to synchronize scan start timing in the sub-scanning direction of the light beams L. The reflecting mirror 208 reflects the light beams L to a synchronization detecting device 210 that includes a photodiode and the like before starting the scanning in the sub-scanning direction. When detecting the light beams, the synchronization detecting device 210 generates a synchronizing signal to start sub-scanning and synchronizes a process for generating a drive control signal to the VCSEL 200 and the like.

The VCSEL 200 is driven by a pulse signal sent from a GAVD 310, as described below, to expose the light beams L at positions corresponding to the predetermined image bits of image data and form an electrostatic latent image on the photo conductor drum 104a.

Figure 4:
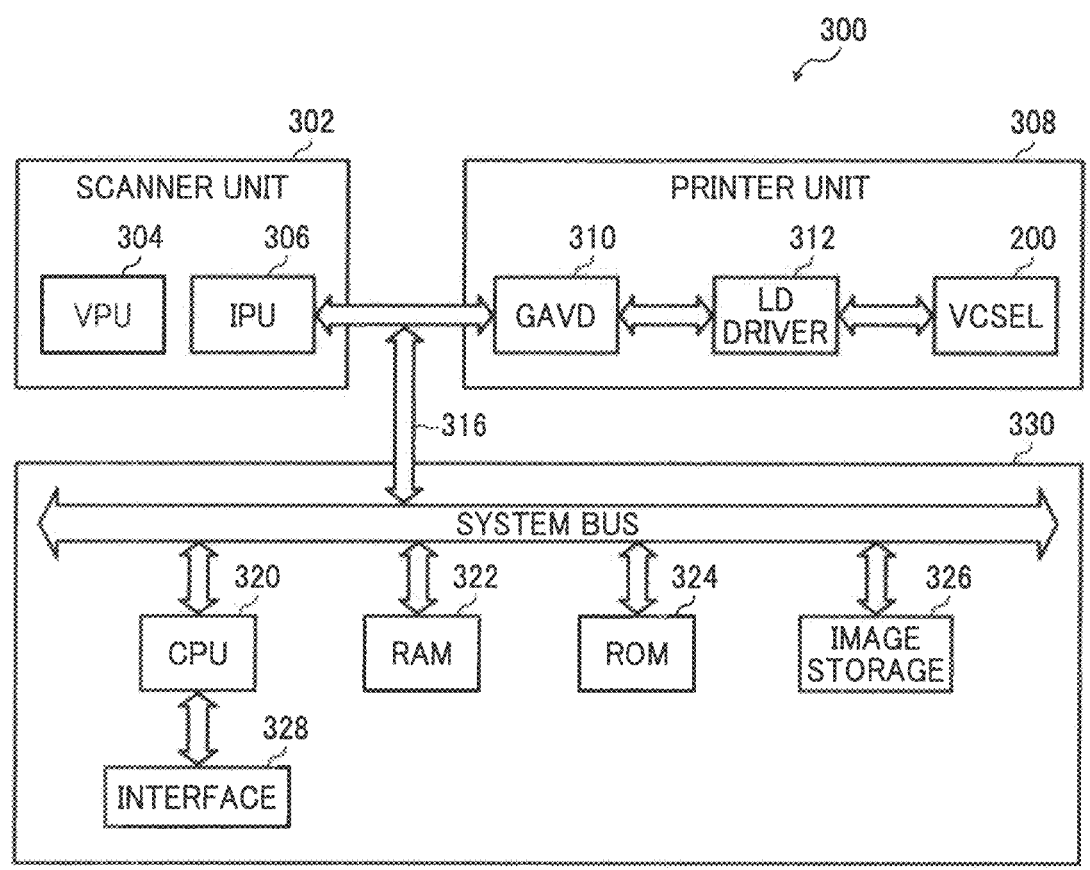
FIG. 4 is a schematic functional block diagram illustrating a control unit of the image forming apparatus.

FIG. 4 is a schematic functional block diagram illustrating a control unit 300 of the image forming apparatus 100. The control unit 300 includes a scanner unit 302, a printer unit 308 and, a main control unit 330. The scanner unit 302 functions as a means for reading an image that includes a VPU 304 and an IPU 306. The VPU 304 performs analog-to-digital conversion on a signal read by a scanner and performs black offset correction, shading compensation, and pixel position correction on the converted signal. The IPU 306 performs image processing for digital-converting mainly the acquired image of an RGB color coordinate system into the image data of a CMYK color coordinate system. The reading image acquired by the scanner unit 302 is sent to the printer unit 308 as digital data.

The printer unit 308 includes the GAVD 310, an LD driver 312, and the VCSEL 200. The GAVD 310 functions as a control means for performing the drive control of the VCSEL 200. The LD driver 312 supplies currents for driving semiconductor laser devices to the semiconductor laser devices in response to a drive control signal generated by the GAVD 310. The VCSEL 200 mounts thereon the semiconductor laser devices that are arranged in a two-dimensional manner. The GAVD 310 of the present embodiment divides pixel data and carries out a high-resolution process for the image data sent from the scanner unit 302 in such a manner that the pixel data corresponds to the spatial size of the semiconductor laser devices projected by the VCSEL 200.

Moreover, the scanner unit 302 and the printer unit 308 are connected to the main control unit 330 via a system bus 316 and are controlled for image reading and image forming in accordance with the command of the main control unit 330. The main control unit 330 includes a central processing unit (hereinafter, "CPU") 320 and a RAM 322 that provides a process space that is used for the process of the CPU 320. The CPU 320 can use any CPU that has been known till now. For example, the CPU 320 can use CISC (Complex Instruction Set Computer) such as the PENTIUM (registered trademark) series or a compatible CPU thereof, RISC (Reduced Instruction Set Computer) such as MIPS, or the like. The CPU 320 accepts a command from a user via an interface 328 and calls a program module that executes a process corresponding to the command to execute a process such as copy, facsimile, scanning, or image storage. The main control unit 330 further includes a ROM 324 that stores therein the initial setting data of the CPU 320, control data, a program, and the like to be able to be used by the CPU 320. An image storage 326 is configured as a fixed or removable memory device such as a hard disk drive, an SD card, or a USB memory and stores therein image data acquired by the image forming apparatus 100 to be able to be used for various types of processes by the user.

When the printer unit 308 is driven to output an image on the photo conductor drum 104a as an electrostatic latent image by using the image data acquired by the scanner unit 302, the CPU 320 carries out main-scanning direction control and sub-scanning position control of an image receiving member such as premium grade paper or plastic film. When starting the scanning of the sub-scanning direction, the CPU 320 outputs a start signal to the GAVD 310. When the GAVD 310 receives the start signal, the IPU 306 starts a scanning process. After that, the GAVD 310 receives image data stored in a buffer memory or the like, processes the received image data, and outputs the processed image data to the LD driver 312. When receiving the image data from the GAVD 310, the LD driver 312 generates the drive control signal of the VCSEL 200. After that, the LD driver 312 transmits the drive control signal to the VCSEL 200 to turn on the VCSEL 200. In addition, the LD driver 312 drives the semiconductor laser devices by using PWM control and the like. The VCSEL 200 explained in the present embodiment includes 8-channel semiconductor laser device. However, the number of channels of the VCSEL 200 is not limited to this.

Figure 5:
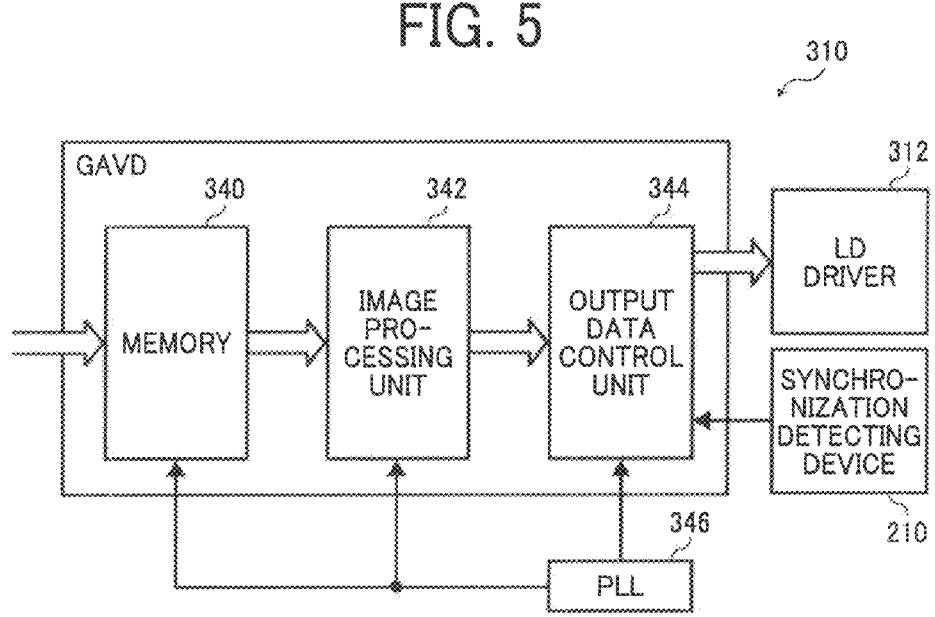
FIG. 5 is a detailed functional block diagram of GAVD.

FIG. 5 is a detailed functional block diagram of the GAVD 310. The GAVD 310 includes a memory 340 such as a FIFO buffer that stores therein the image data sent from the IPU 306 and hands over the image data sent from the IPU 306 to an image processing unit 342 in a first-in and first-out method by receiving a synchronizing signal. The image processing unit 342 reads the image data from the memory 340 and carries out the resolution conversion of image data, the assignment of semiconductor laser device channel, and an addition/deletion process (or, correction process of image data) of image bit (or, correction pixel for zooming image data). A position at which the image data is exposed on the photo conductor drum 104a is defined by a main-scanning line address value defined in a main-scanning direction and a sub-scanning line address value defined in a sub-scanning direction. Hereinafter, in the present embodiment, address coordinates are defined as the set of each address value that gives a specific image bit when image data is designated by a main-scanning line address value (R address value) and a sub-scanning line address value (F address value). These address values are decided by an address generating unit 354 as described below. Moreover, these address coordinates are decided for pixels (or, pixel column) that are arrayed at lines located in the main-scanning and sub-scanning directions. An image path selector 358 (described later) performs, every pixel column, a correction process for inserting a pixel bit on a pixel located at the address (or, pixel position) of coordinates designated by the R address value and the F address value by the address generating unit 354 to be described below.

An output data control unit 344 converts the F address value and sub-scanning speed of output data that is expected to be a writing signal corresponding to the image data generated by the image processing unit 342 into a time-series drive pulse. The output data control unit 344 further generates a synchronous control signal for giving a synchronizing signal to the synchronization detecting device 210. The generated drive control signal is transmitted to the LD driver 312 to drive VCSEL (not illustrated). Moreover, the output data control unit 344 is supplied with the synchronizing signal output from the synchronization detecting device 210 to synchronize the transmission of the drive control signal to the LD driver 312. In addition, the processes performed by the memory 340, the image processing unit 342, and the output data control unit 344 are synchronized with an operating clock by a PLL 346.

Figure 6:
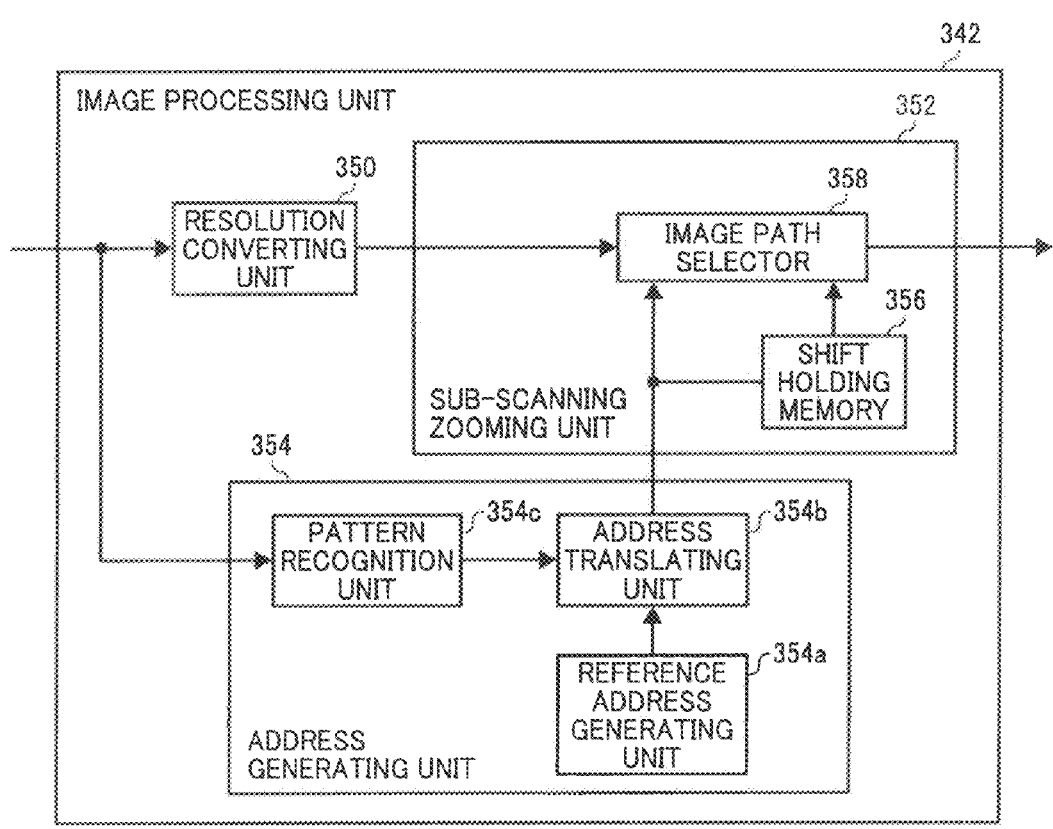
FIG. 6 is a functional block diagram of an image processing unit according to a first embodiment.

FIG. 6 is a functional block diagram of the image processing unit 342 illustrated in FIG. 5. As illustrated in FIG. 6, the image processing unit 342 includes a resolution converting unit 350, a sub-scanning zooming unit 352, and the address generating unit 354.

The resolution converting unit 350 divides the image data acquired from the memory 340 to create unit pixels corresponding to the number of channels and the size of the VCSEL 200 and creates divided pixels. After that, the resolution converting unit 350 performs, on the divided pixel, the assignment of the channel of laser device that irradiates the pixel. Moreover, when high resolution process is performed, the resolution converting unit 350 selects a 2n double-density process (n is a positive integer) or a 2n-line process and decides the drive assignment of the channel of laser device.

The address generating unit 354 decides an address value of which the image bit is appended or deleted by a sub-scanning zooming process. The address generating unit 354 includes a reference address generating unit 354a, an address translating unit 354b, and a pattern recognition unit 354c.

The reference address generating unit 354a decides an address value (F address) to be appended or deleted. The address translating unit 354b determines whether the image bit of the address value to be appended or deleted determined by the reference address generating unit 354a is a correction target based on "match" data (described later) output from the pattern recognition unit 354c. When it is determined that the image bit is a correction target, the address translating unit 354b shifts the address value to be appended or deleted in a sub-scanning direction.

The pattern recognition unit 354c stores an image matrix. The pattern recognition unit 354c pattern-matches the image matrix with the pixel column and outputs the matching result as "match" data. FIG. 7A is a schematic diagram illustrating an example of an image matrix. In the image matrix illustrated in FIG. 7A, a pixel surrounded with a central rectangle indicates a target pixel.

In the present embodiment, the pattern matching performed by the pattern recognition unit 354c is carried out before a writing resolution conversion process. However, the present invention is not limited to this. The pattern matching may be carried out after the writing resolution conversion process.

FIG. 7B is a schematic diagram illustrating the pattern example of a recognizing pixel column. The pattern recognition unit 354c determines whether pixels are black or white by using the image matrix and outputs "match" data when each is identical with the corresponding pattern. In the example illustrated in FIG. 7B, the pattern recognition unit 354c outputs "match"=1 when one black pixel is present before and after the target pixel. When the pixels are not identical with any pattern, the pattern recognition unit 354c outputs "match"=0.

Figure 8:
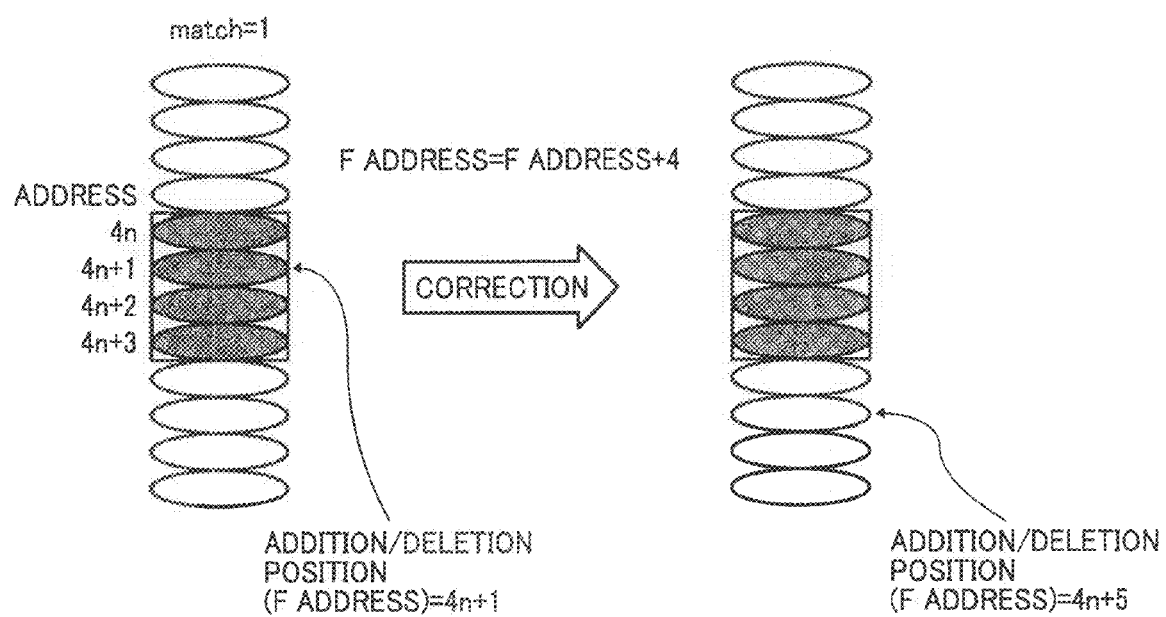
FIG. 8 is a schematic diagram explaining an operation of an address translating unit.

Next, will be explained in detail the address translating unit 354b. FIG. 8 is a schematic diagram explaining the operation of the address translating unit 354b. Will be explained the case where the address translating unit 354b is supplied with "match"=1 and F address=4n indicating an addition/deletion position.

The pattern matching by the pattern recognition unit 354c in the present embodiment is a main/sub 1200 dpi image just before the resolution conversion process. On the other hand, because the zooming is processed by a pixel unit after the resolution conversion process, pattern matching data and an address have a relation illustrated in FIG. 8.

In other words, when "match"=1 and addition/deletion position (F address)=4n+1, the address translating unit 354b determines that the addition/deletion position is 1200 dpi 1dot black and shifts the position to the rear end of the sub-scanning direction like "F address=F address+4=4n+5".

Figure 9:
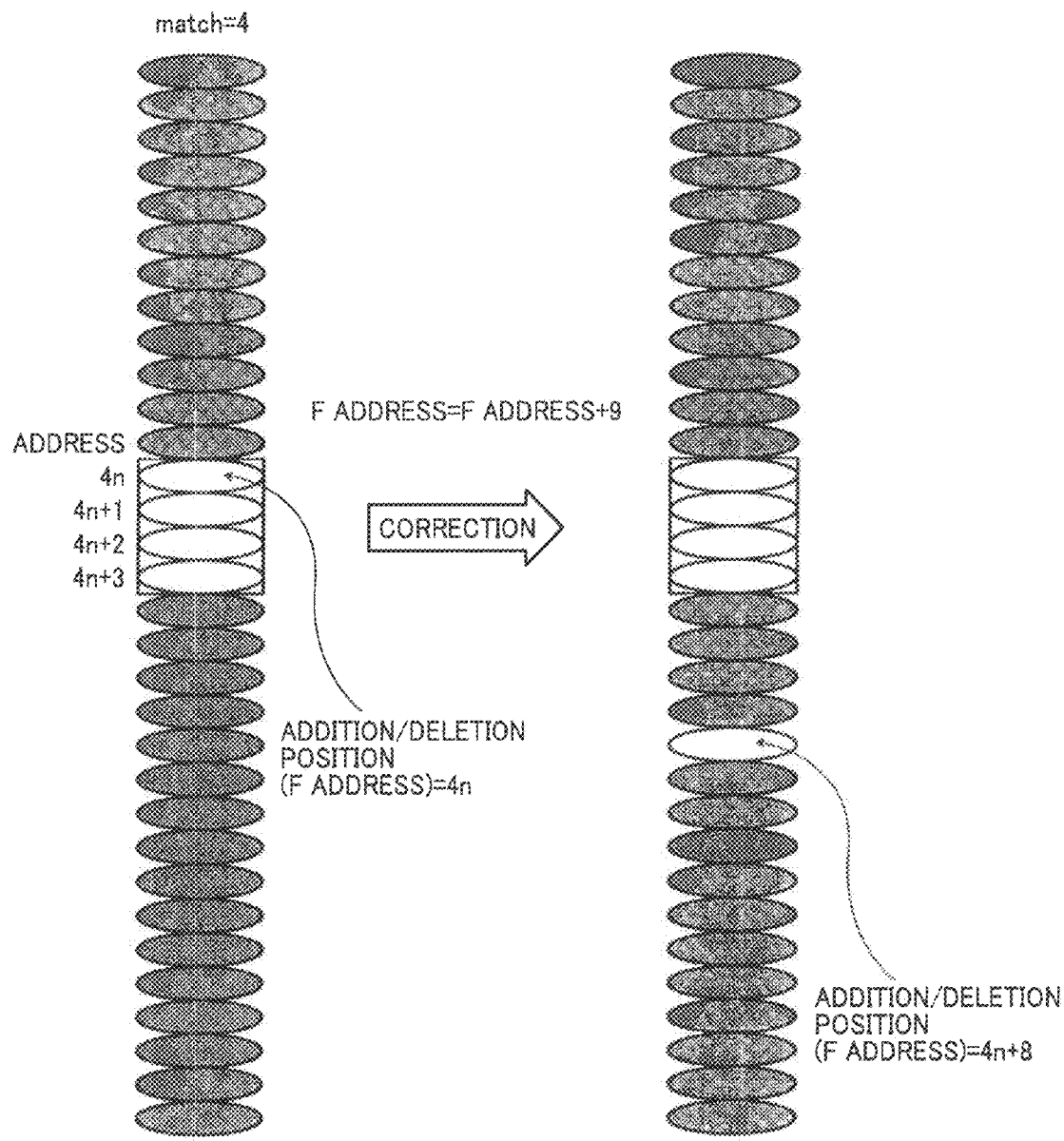
FIG. 9 is a schematic diagram explaining an operation when a white pixel is identical to an addition/deletion position according to a zooming process.

FIG. 9 is a schematic diagram explaining an operation when a white pixel is identical to an addition/deletion position according to a zooming process. The "match=4" indicates white pixel 1 dot. When the F address=4n is the addition/deletion position, the address translating unit 354b shifts the position to the rear end of the sub-scanning direction like "F address=F address+8=4n+8".

In this case, a shift amount in the sub-scanning direction is previously determined and saved for each "match" value. As an example, a relation between the "match" data and the shift amount to the sub-scanning direction is as follows. However, the present invention is not limited to this.

match=0: sub-scanning shift amount=0
    match=1: sub-scanning shift amount=4
    match=2: sub-scanning shift amount=4
    match=3: sub-scanning shift amount=8
    match=4: sub-scanning shift amount=8
    match=5: sub-scanning shift amount=8
    match=6: sub-scanning shift amount=12

Returning to FIG. 6, the sub-scanning zooming unit 352 includes the image path selector 358 and a shift holding memory 356. The sub-scanning zooming unit 352 receives the F and R addresses that are used to form an image from the address generating unit 354 and determines whether an address value to be processed includes an address value of which the image bit is appended or deleted. The sub-scanning zooming unit 352 generates zooming command signals such as an addition flag or a deletion flag with respect to an address of which the image bit is appended and deleted and hands over the zooming command signals to the image path selector 358 and the shift holding memory 356. The shift holding memory 356 stores therein a shift amount by which an image bit is shifted and counts and holds the zooming command signals. The image path selector 358 sets the data of the image bit to white data and shifts subsequent image data by one bit when an image is being expanded and the zooming command signal is set. When the zooming command signal is not set, the image path selector 358 selects and outputs input data from the resolution converting unit 350 based on the shift amount output from the shift holding memory 356. In the present embodiment, when the 8-channel VCSEL 200 is used as a semiconductor laser, a signal indicating a position to be appended and deleted and a signal indicating a shift amount are assigned by 8 channels to be used to drive the VCSEL 200. In addition, a calculation part for appending and deleting an image bit can be configured as a dedicated module or can be configured as a part of another module if the calculation part is an appropriate function part of the image processing unit 342. In addition, the reason for counting the zooming command signals is, for example, to append an image bit at the step of a first scanning and then specify a position at which an image bit is appended at the beginning of the second scanning when shifting an image bit.

Figure 10A:
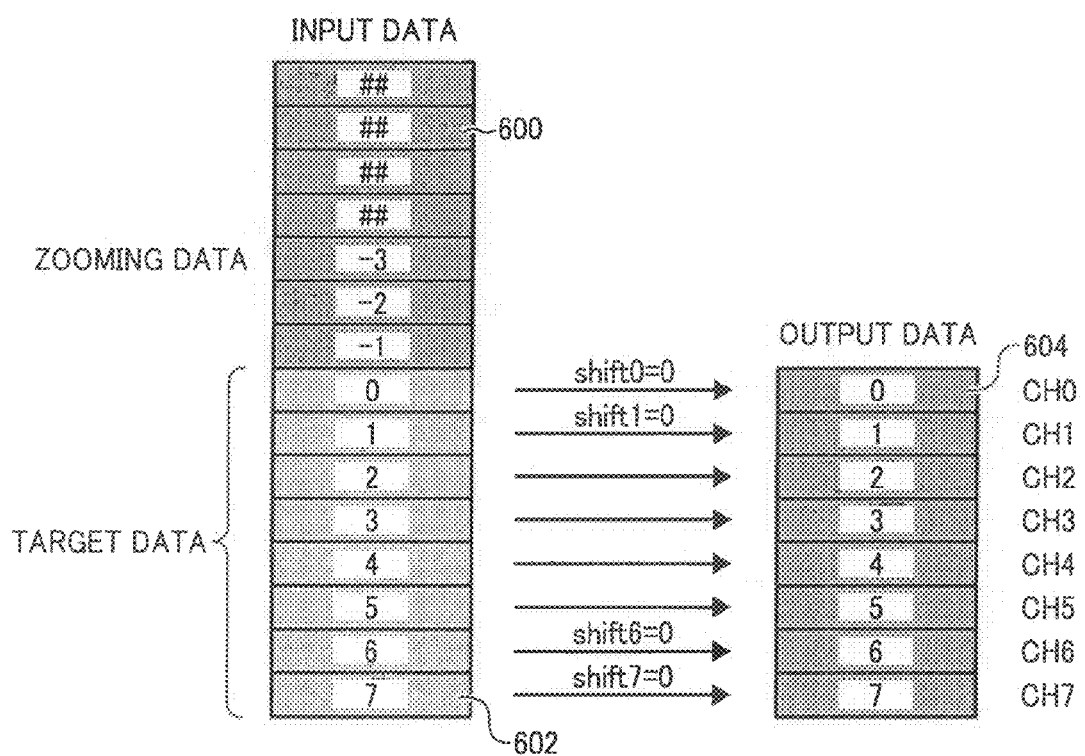
FIG. 10A is a diagram illustrating an operation example of an image path selector when a pixel bit is not appended.

With reference to FIGS. 10A and 10B, will be explained an operation of the image path selector 358. Target data 602 of FIGS. 10A and 10B indicates a bit value for one pixel. Data for one pixel is indicated by secondary coordinates for 8 channels and is bit data assigned at a specific main-scanning coordinate position. As input data 600, the target data 602 and zooming data for designating a shifting unit for sub-scanning zooming are always read from the memory 340 in the preceding-stage. The same process is performed on all lines and then the processed data are input into the resolution converting unit 350. Because a zooming command signal is not set at the time of unzooming illustrated in FIG. 10A, it is considered that a shift amount from the shift holding memory 356 is zero (shift=0), and the image data of the target data 602 is handed over as output data 604 that is considered as a writing signal in the case of the embodiment as illustrated in FIG. 10A.

Next, will be explained an operation when a zooming command signal is set with reference to FIG. 10B. In FIG. 10B, in the case of a first scanning (A), white is appended to the secondary coordinates 1 of the target data 602. A signal indicating the addition of an image bit is set to an address value corresponding to CH1. The bit data of CH1 is replaced to correspond to a white pixel and is set in the CH1 of output data 606 as data. Then, a count value 1 that corresponds to addition corresponding to CH1 is registered in the shift holding memory 356.

The data of CH2 to CH7 are shifted by secondary-coordinate values that are obtained by employing a channel shift amount-1 as the values of the secondary coordinates of the output data 606. At this time, the image path selector 358 can assign the bit data of the target data of the channels corresponding to the channel shift amount-1 to the CH2 to CH7 of the output data 606 to append an image bit. An image bit corresponding to white is appended to the output data 606 in regard to the target data. The output data 606 is used as a writing signal. The output data control unit 344 serially converts the writing signal and generates the drive pulse of the VCSEL 200 to form an image. The process described above is performed in a main-scanning unit. Data is sequentially read from the memory 340 for the next pixel of the main-scanning direction and image forming is performed in the main-scanning direction.

As described above, because the secondary-coordinate values of the CH1 to CH7 of the output data 606 are shifted by appending a white pixel in the first scanning (A), the secondary-coordinate values of CH8 to CH15 of the output data 606 are shifted by −1 in the second scanning (B) as illustrated in FIG. 10B even if a white pixel is not appended. Furthermore, when a white pixel is appended similarly to the first scanning in the third scanning (C), the secondary-coordinate values of CH16 to CH23 of the output data 606 are shifted by −2 as illustrated in FIG. 10B.

Figure 11A:
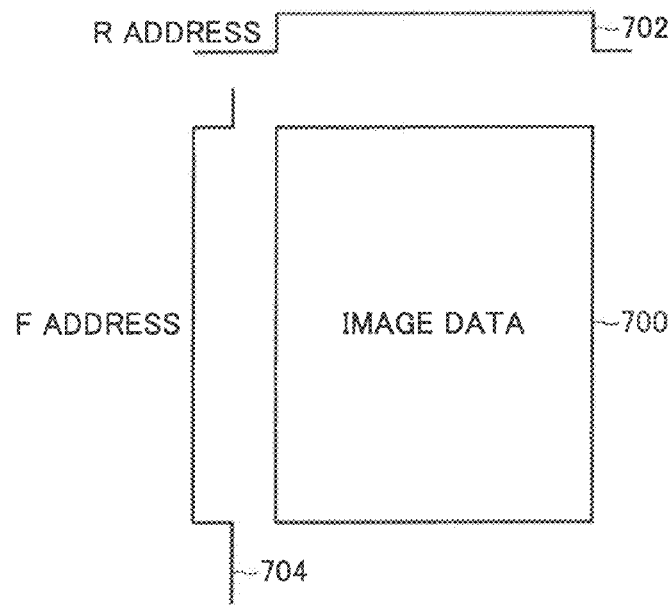
FIG. 11A is a diagram illustrating an example of a relation between image data and R and F addresses.
Figure 11B:
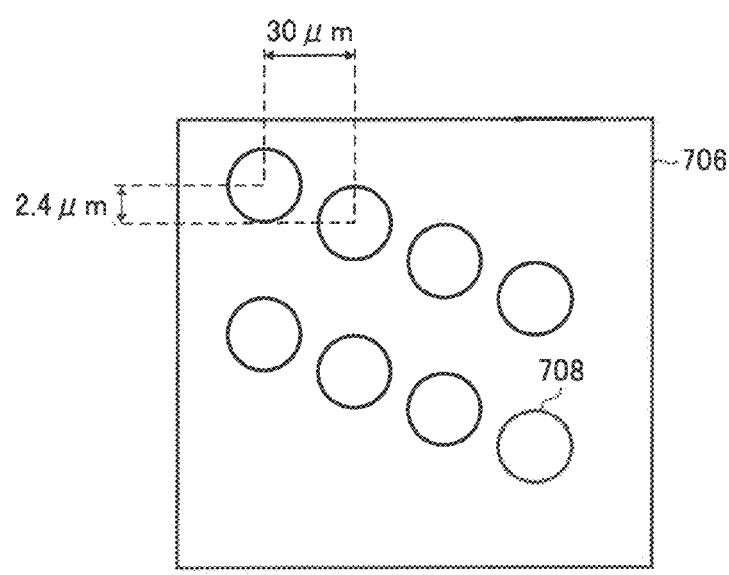
FIG. 11B is a diagram illustrating an example of a relation between a unit pixel and a laser spot.

FIGS. 11A and 11B illustrate a relation between image data, an R address, and an F address and a relation between a unit pixel and a laser spot according to the VCSEL 200. FIG. 11A illustrates a relation between image data and each address. FIG. 11B illustrates a relation between a unit pixel and a laser spot. As illustrated in FIG. 11A, an R address 702 decides the pixel position of the main-scanning direction for image data 700 and is a value corresponding to a writable range in the feeding direction of the image receiving member. Moreover, an F address 704 is a value for deciding the pixel position of the sub-scanning direction for the image data 700. The feed of the main-scanning direction and the lighting control of the VCSEL 200 are performed in correspondence with these address values. The light beams scan over the photo conductor drum to form an electrostatic latent image on which a zooming control is performed.

FIG. 11B illustrates laser spots 708 by which a pixel area 706 is irradiated. In the present embodiment, the VCSEL 200 includes 8-channel semiconductor laser device. The laser spots 708 of the semiconductor laser devices are formed by two lines of which each has 4 channels. Moreover, the laser spots 708 constituting a line are arranged to have the interval of 2.4 micrometers in the sub-scanning direction and to have the interval of 30 micrometers in the main-scanning direction. In other words, the pixel area 706 is irradiated with the laser spots 708 illustrated in FIG. 11B with resolution in which a unit pixel is divided into 16 areas by dividing the pixel area 706 into 4 areas in the sub-scanning direction and into 4 areas in the main-scanning direction. In the embodiment of FIG. 11B, a laser modulation pitch (beam pitch) in the sub-scanning direction is ¼ of the read pixel resolution. Specifically, when the input resolution of pixel is 1200 dpi (dots per inch), a latent image can be formed at a 4800 dpi beam pitch as effective resolution.

The (a) part of FIG. 12 is a schematic diagram explaining an example of a high-resolution process executed by the resolution converting unit 350. The resolution converting unit 350 converts 2-bit image data 808 with input resolution 1200 dpi of unit pixel 800 into 16 1-bit divided pixel data 802 with output resolution 4800 dpi illustrated in the example of the (a) part of FIG. 12 in order to perform a high-resolution process in which a so-called four-time dense process is carried out in the main-scanning direction and sub-scanning direction. The channel of the semiconductor laser device that performs exposure is assigned to each of the divided pixel data 802, which is used to generate a drive control signal.

In the present embodiment, although performed is the high-resolution process for converting the 2-bit image data 808 with input resolution 1200 dpi of the unit pixel 800 into the divided pixel data 802 illustrated in the (a) part of FIG. 12, the present invention is not limited to this process. For example, the resolution converting unit 350 may be configured in such a manner that a high-resolution process for converting the 2-bit image data 808 with input resolution 1200 dpi of the unit pixel 800 into divided pixel data illustrated in the (b) part of FIG. 12 is performed.

In the example illustrated in the (b) part of FIG. 12, resolution has 1 bit and 1200 dpi in the main-scanning direction and 4800 dpi in the sub-scanning direction. Therefore, divided pixel data 804 are illustrated as a 4 lines of 1200 dpi×4 bits. In other words, the resolution converting unit 350 may be configured in such a manner that a high-resolution process for converting the 2-bit image data 808 with input resolution 1200 dpi of the unit pixel 800 into the divided pixel data 804 illustrated in the (b) part of FIG. 12 is performed. Also in this case, the channel of the semiconductor laser device that performs the exposure of each divided pixel data is assigned to be provided to generate a drive control signal. The high-resolution process for converting image data into divided pixel data illustrated in the (a) part or (b) part of FIG. 12 can be preferably utilized to cancel comprehensive image defect caused by such as moire of sub-scanning direction or knurling of edge. Furthermore, in the case of the high-resolution process illustrated in the (b) part of FIG. 12, the burden of the subsequent process can be reduced because the number of divided pixels can be reduced to ¼.

Figure 13:
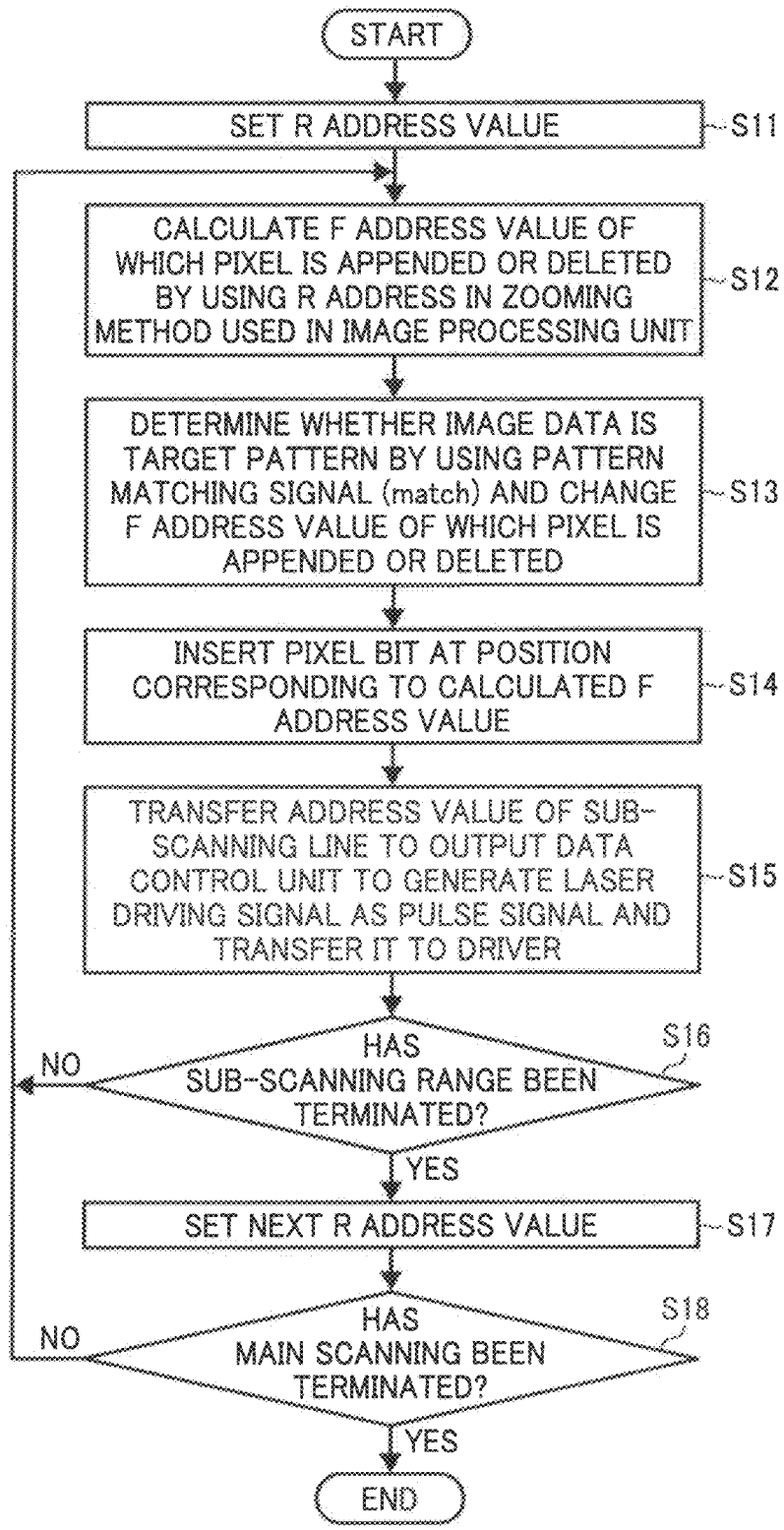
FIG. 13 is a flowchart illustrating the procedure of a zooming process according to the first embodiment.

FIG. 13 is a flowchart illustrating the procedure of a zooming process performed by the image forming apparatus 100 according to the first embodiment. In the zooming process illustrated in FIG. 13, the reference address generating unit 354a first sets an R address value (Step S11). Then, the reference address generating unit 354a calculates an F address value to be appended or deleted by using the R address in the zooming method that is used in the image processing unit 342 (Step S12).

Next, the pattern recognition unit 354c determines whether image data is a target pattern by performing pattern matching on between an image matrix and a pixel line of which the target pixel is pixels indicated by the F address value and the R address value as described above, and outputs the matching result as "match" data. Then, the address translating unit 354b shifts and changes the F address value of which the pixel is appended or deleted by using the "match" data (Step S13).

Next, the image path selector 358 carries out rewriting by increasing or deleting the R address value that is set at Step S11 and the F address value after the F address that is calculated at Step S13 by one line, and sets an image bit at a pixel given by the address of (the R address value, the F address value) of the sub-scanning line corresponding to the calculated F address (Step S14). In other words, the image path selector 358 performs a correction process on the pixels located at the R address value and the F address value. Moreover, in the case of the addition of sub-scanning line, the insertion of sub-scanning line can be performed without rewriting the F address values in descending order in correspondence with the addition of sub-scanning line. For example, F address values to be appended are generated by using the values of two sub-scanning lines before and after the line to be appended as an index and are handed over to the output data control unit 344.

Next, the image path selector 358 reads out bit data in an F address range to be processed and transfers the bit data to the output data control unit 344 (Step S15). The output data control unit 344 generates a pulse signal at a timing corresponding to a pixel position, sends the pulse signal to the LD driver 312, and drives the semiconductor laser device.

In the process of Step S14, a value corresponding to 1200 dpi can be assigned for one line. Furthermore, in a state where the value of F address corresponding to 4800 dpi that is the resolving power of the sub-scanning direction of the VCSEL 200 for the F address will be previously assigned, high-resolution zooming control can be realized by using controlling the drive of the semiconductor laser device of the VCSEL 200 at the 4800 dpi level.

Then, the image path selector 358 determines whether the transfer of pixel data in the default F address range that is assigned at 1200 dpi has been terminated based on the comparison of F address values or based on the reception of termination character bit (Step S16). When it is determined that the scanning in the sub-scanning range is terminated (Step S16: Yes), the reference address generating unit 354a sets the next R address value (Step S17). After that, the sub-scanning zooming unit 352 determines whether the scanning in the main-scanning range has been terminated (Step S18). When the scanning performed in the main-scanning direction is not terminated (Step S18: No), the process control moves to Step S12 to repeat the process of Steps S12 to S18.

On the other hand, when the image path selector 358 determines that the scanning in the sub-scanning range is not terminated at Step S16 (Step S16: No), the process control moves to Step S12 to repeat the process of Steps S12 to S16 until the F address values in the scanning range are terminated. When it is finally determined that the scanning in the address range that should be processed on the image receiving member is terminated at Step S18 (Step S18: Yes), the sub-scanning zooming unit 352 terminates the process.

Figure 14:
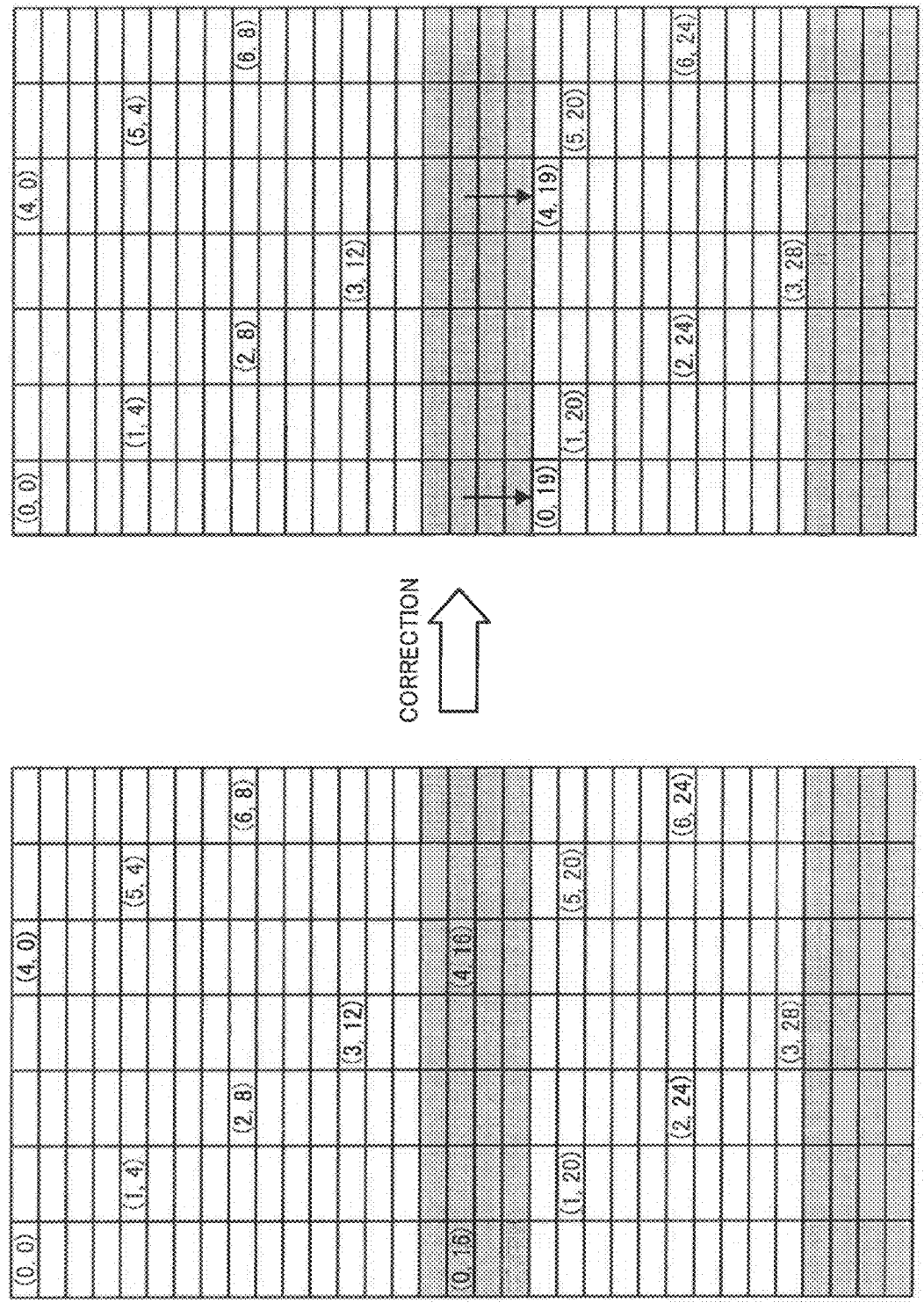
FIG. 14 is an explanation diagram illustrating an addition/deletion position before position correction, and an addition/deletion position after position correction of a pixel.

FIG. 14 is an explanation diagram illustrating an addition/deletion position before position correction and an addition/deletion position after position correction of a pixel. In the example illustrated in FIG. 14, the pixels of coordinates (0, 16) and (4, 16) are identical with a black pixel and thus zooming process pixels are moved to coordinates (0, 19) and (4, 19).

FIG. 15 is an explanation diagram illustrating an example of an image that is obtained by performing a zooming process on the addition/deletion position before position correction and a zooming process on the addition/deletion position after position correction of a pixel. In FIG. 15, three-pixel black lines occur as surrounded by circles before the position correction. However, an image that is obtained by performing a zooming process at the addition/deletion position after position correction has four-pixel black lines and thus a negative effect such as banding can be reduced.

In this way, in the present embodiment, the pattern recognition unit 354c recognizes a thin black line or a thin white line by using matching. When the addition/deletion position according to the zooming process is identical with the thin black line or the thin white line by the address translating unit 354b, the thin black line or the thin white line can become thinner to reduce the thickness and the generation of banding can be prevented because the addition/deletion position is shifted.

Moreover, in the present embodiment, because the pattern recognition unit 354c recognizes a pattern for which dithering is considered, a negative effect to dithering as well as screen tone can be reduced.

In the present embodiment, because a position is shifted by a predetermined amount in the sub-scanning direction and then writing is performed, a circuit configuration can be simplified and a circuit scale can be reduced.

Figure 16:
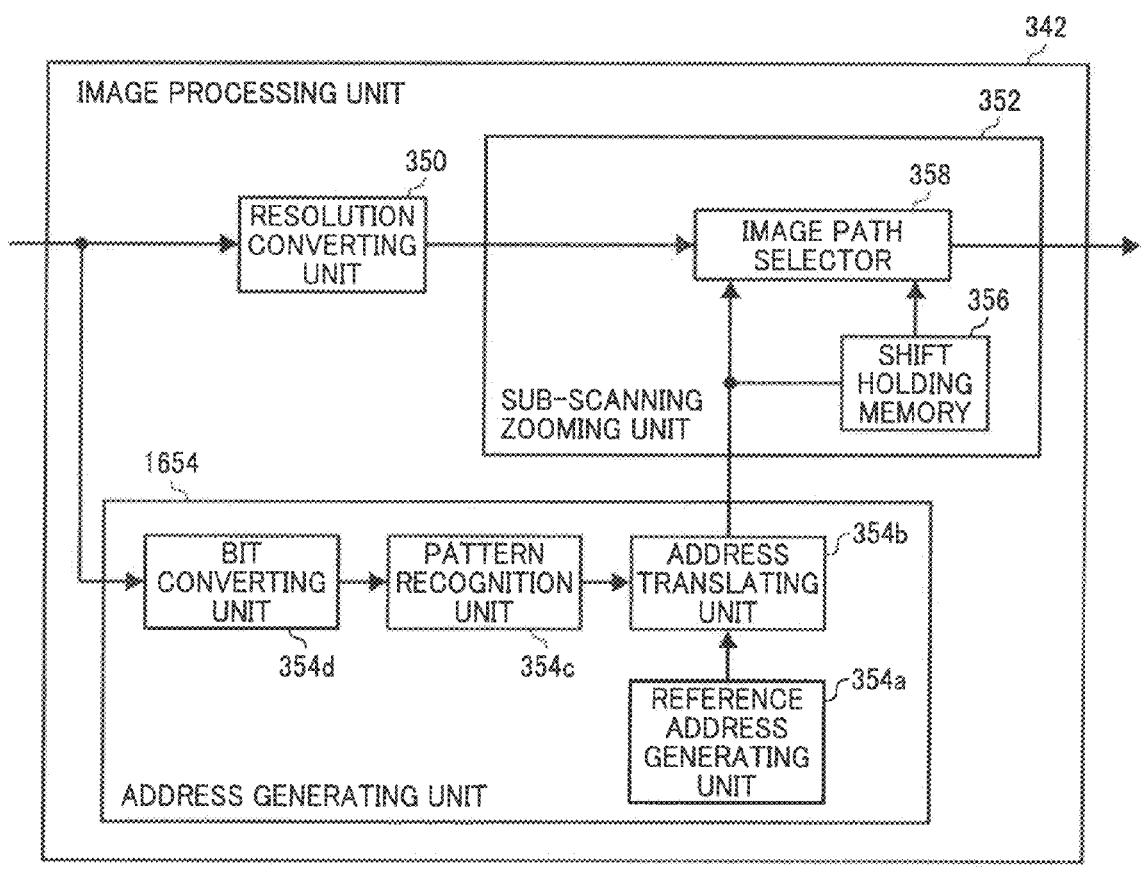
FIG. 16 is a block diagram illustrating the functional configuration of an image processing unit according to a second embodiment.

Next, will be explained a second embodiment. The mechanical configuration of an image forming apparatus of the present embodiment is similar to that of the first embodiment. FIG. 16 is a block diagram illustrating functional configuration of an image processing unit according to the second embodiment. As illustrated in FIG. 16, the image processing unit of the present embodiment mainly includes the resolution converting unit 350, the sub-scanning zooming unit 352, and an address generating unit 1654. The function and configuration of the resolution converting unit 350 and the sub-scanning zooming unit 352 are similar to those of the first embodiment.

The address generating unit 1654 of the present embodiment includes the reference address generating unit 354a, the address translating unit 354b, the pattern recognition unit 354c, and a bit converting unit 354d. The function and configuration of the reference address generating unit 354a, the address translating unit 354b, and the pattern recognition unit 354c are similar to those of the first embodiment.

The bit converting unit 354d binarizes input image data when the input image data is two bits. For example, the bit converting unit 354d converts 11 (binary number) into 1, 10 (binary number) into 1, 01 (binary number) into 1, and 00 (binary number) into 0. In the case of pattern matching performed by the pattern recognition unit 354c, it is determined that 1 is black and 0 is white.

Moreover, the bit converting unit 354d may be configured to convert 2-bit multi-valued data into three values. In this case, the bit converting unit 354d converts 11 (binary number) into 2, 10 (binary number) into 1, 01 (binary number) into 1, and 00 (binary number) into 0. In this case, in the case of pattern matching performed by the pattern recognition unit 354c, it is determined that 2 is black, 1 is half tone, and 0 is white.

According to the zooming process of the present embodiment, in the zooming process explained in FIG. 13, the bit conversion process performed by the bit converting unit 354d is performed between Step S12 and Step S13.

In this way, in the present embodiment, because the bit conversion process of input image data is performed on the input image of multi-valued data before the pattern matching process by the pattern recognition unit 354c, a negative effect such as banding according to a zooming process can be reduced.

Figure 17:
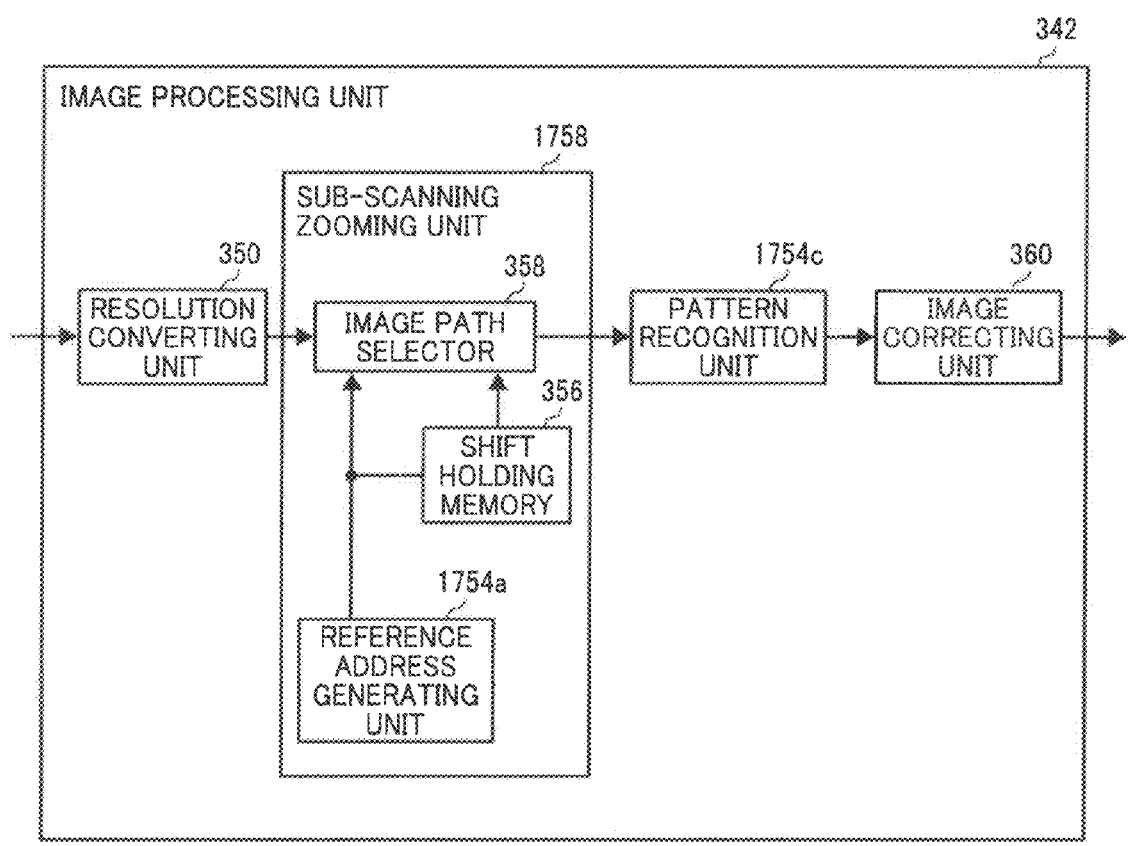
FIG. 17 is a block diagram illustrating the functional configuration of an image processing unit according to a third embodiment.

Next, will be explained a third embodiment. The mechanical configuration of an image forming apparatus of the present embodiment is similar to that of the first embodiment. FIG. 17 is a block diagram illustrating the functional configuration of an image processing unit according to the third embodiment. As illustrated in FIG. 17, the image processing unit of the present embodiment mainly includes the resolution converting unit 350, a sub-scanning zooming unit 1758, a pattern recognition unit 1754c, and an image correcting unit 360. The function and configuration of the resolution converting unit 350 is similar to those of the first embodiment.

As illustrated in FIG. 17, the sub-scanning zooming unit 1758 includes a reference address generating unit 1754a, the shift holding memory 356, and the image path selector 358.

The reference address generating unit 1754a decides an address value of which the image bit is appended or deleted according to a sub-scanning zooming process similarly to the first embodiment. The image path selector 358 carries out the addition or deletion of an image and shifts image data in accordance with the address value determined by the reference address generating unit 1754a.

The pattern recognition unit 1754c performs pattern matching on the image data on which the sub-scanning zooming process is performed by using an image matrix similar to that of the first embodiment. Then, when the image data is identical with the pattern of a predetermined correction target, the pattern recognition unit 1754c outputs the image data of a target pixel to the image correcting unit 360 and the image correcting unit 360 converts the input image data into predetermined lighting data.

Figure 18:
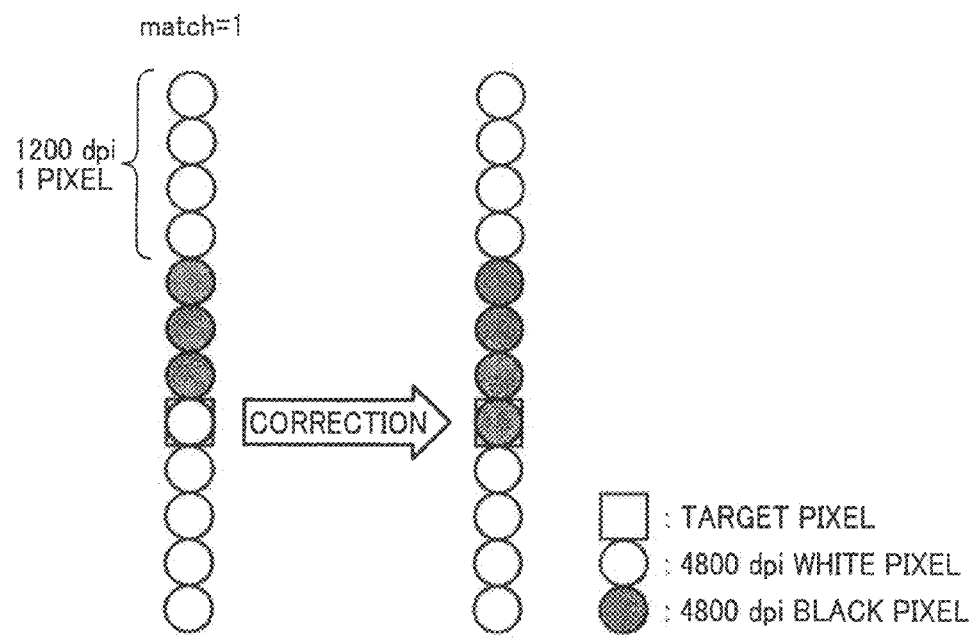
FIG. 18 is a schematic diagram illustrating an example of a case where pixel deletion performed by a reduction process affects to a 1200 dpi black 1 pixel portion and a pixel becomes thinner.

FIG. 18 is a schematic diagram illustrating an example of the case where pixel deletion performed by a reduction process is onto a 1200 dpi black 1 pixel portion, whose pixel has become thinner. When the target pixel is identical with the pattern illustrated at the left side of FIG. 18, the pattern recognition unit 1754c outputs "match" data=1. When "match" data=1, the image correcting unit 360 converts the target pixel into F[hex] indicating a black pixel.

Image conversion performed by the image correcting unit 360 is as described below.
  match=0→without correction
  match=1→F[hex] (black pixel)
  match=2→0[hex] (white pixel)

Figure 19:
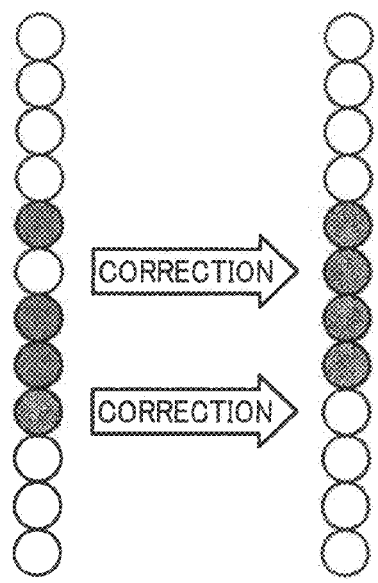
FIG. 19 is a schematic diagram illustrating an image correction example when pixel addition performed by an expansion process affects to a 1200 dpi black 1 pixel portion.
Figure 20:
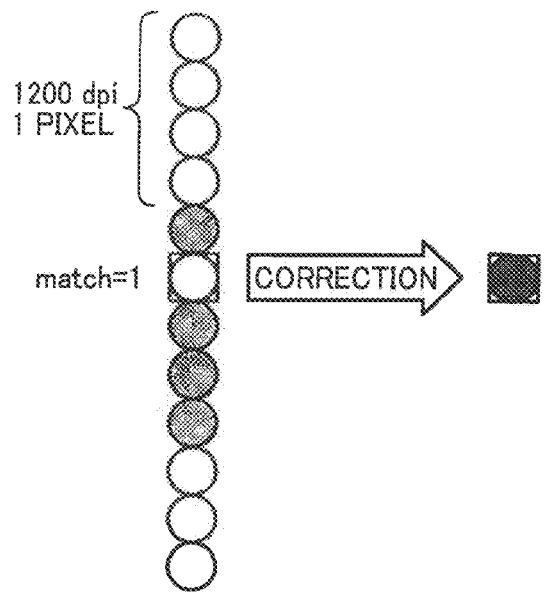
FIG. 20 is a schematic diagram illustrating a pattern matching example according to the third embodiment.
Figure 21:
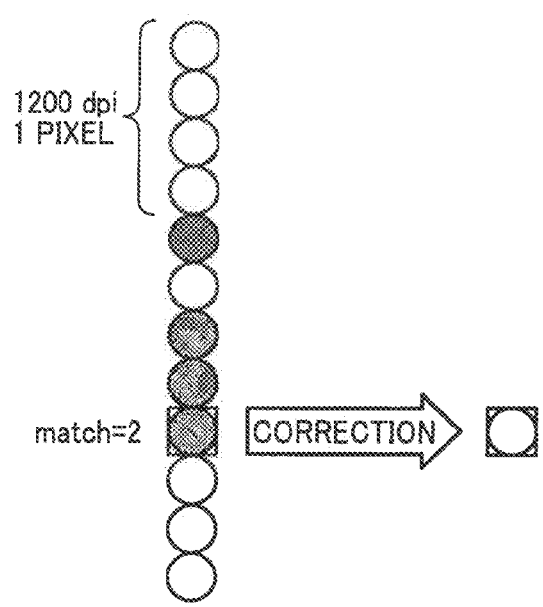
FIG. 21 is a schematic diagram illustrating a pattern matching example according to the third embodiment.

FIG. 19 is a schematic diagram illustrating an image correction example when pixel addition performed by an expansion process is onto a 1200 dpi black 1 pixel portion. When line width correction is not performed, a white pixel appended by the expansion process is broken on electrophotography and one black pixel seems to become thick. In the present embodiment, to perform image correction as illustrated in FIG. 19, pattern matching is performed by the pattern recognition unit 1754c and the image data of a target pixel is corrected by the image correcting unit 360 as illustrated in FIGS. 20 and 21.

Figure 22:
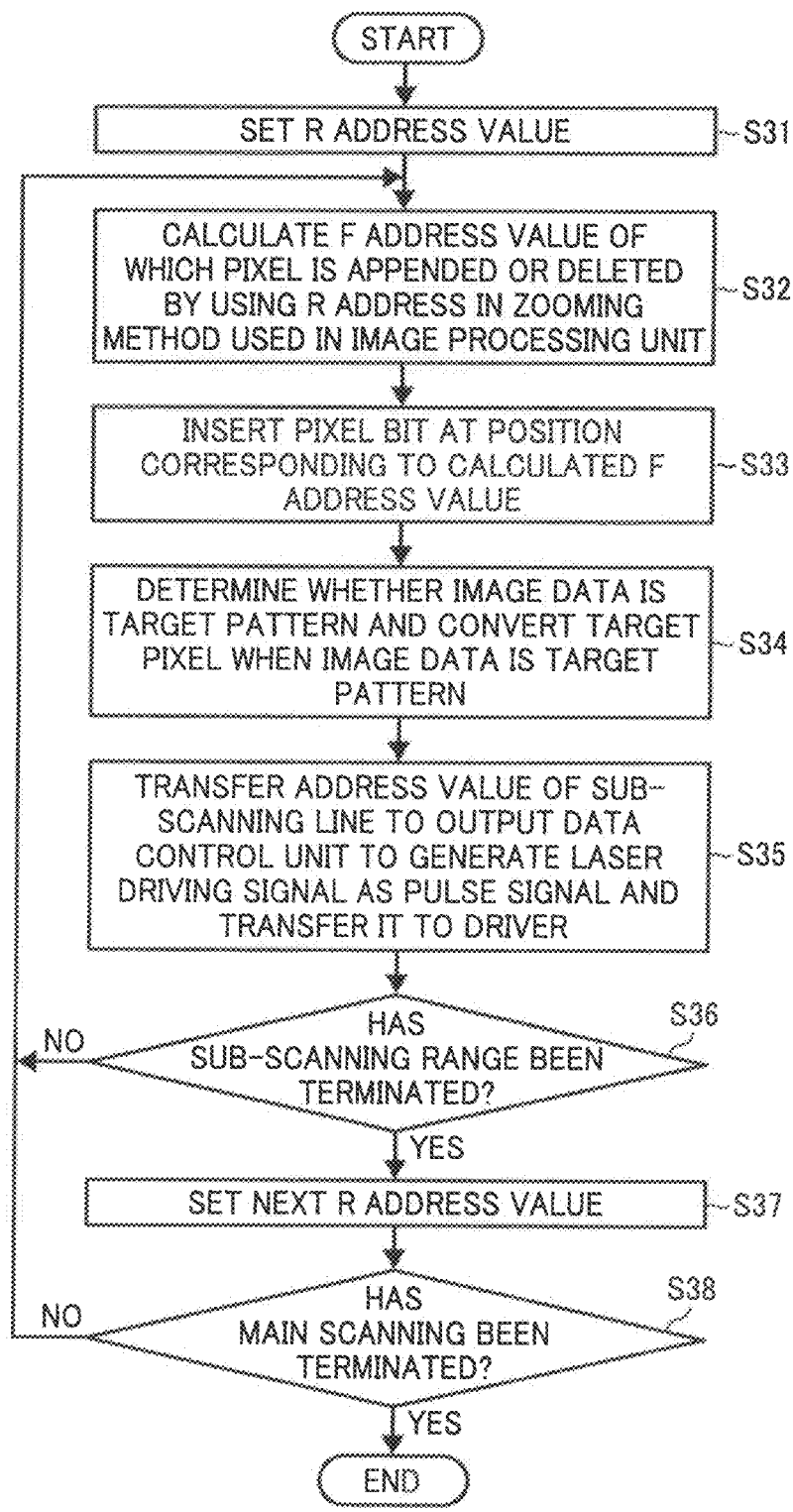
FIG. 22 is a flowchart illustrating the procedure of a zooming process according to the third embodiment.

FIG. 22 is a flowchart illustrating the procedure of a zooming process according to the third embodiment. The processes of Steps S31 and S32 are performed similarly to those of the first embodiment.

The image path selector 358 increases or deletes the R address value that was set at Step S31 and an F address value after the F address was calculated at Step S32 by one line to carry out rewriting, and sets an image bit at a pixel given by the address (of the R address value, the F address value) on the sub-scanning line corresponding to the calculated F address (Step S33). In other words, the image path selector 358 performs a correction process on a pixel located at the R address value and the F address value.

Then, the pattern recognition unit 1754c performs pattern matching on the image data on which sub-scanning zooming is performed. When it is determined that the image data falls on a target pattern, the image correcting unit 360 converts the image data into predetermined image data (Step S34).

After that, the processes of Steps S35 to S38 are performed similarly to those of Steps S15 to S18 of the zooming process according to the first embodiment.

In this way, according to the present embodiment, because the F address and the R address are calculated to perform the addition/deletion of a pixel, pattern matching is performed, and image correction is performed based on the result, the generation of banding can be prevented similarly to the first embodiment.

In addition, according to the present embodiment, although pattern matching is carried out by binary image data and the result is converted into F[hex] or 0[hex], the present invention can be configured that pattern matching is performed on half-tone image data and the result is converted.

The image forming method described above is executed by a computer mounted on the image forming apparatus and is described by a programming language such as an assembler or a C language. Furthermore, the image forming method can be realized by a computer-readable program and can be stored in a computer-readable recording medium that records the program.

As described above, according to an aspect of the present invention, a zooming process can be controlled at a level of a semiconductor laser device, high-speed printing and high-resolution image forming when printing double-sided can be realized without wide-ranged image degradation such as moire caused by the zooming process, and the generation of banding can be prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
  a positioning unit configured to acquire
    a misalignment amount of a pixel in a main-scanning direction and
    a misalignment amount of the pixel in a sub-scanning direction from a position of the main-scanning direction,
      the pixel being used as a reference pixel for zooming image data, and
      the image data consisting of a plurality of pixels, and
    to decide a position of a pixel, the pixel being a correction target, as a target pixel based
      on the misalignment amount in the main-scanning direction and
      on the misalignment amount in the sub-scanning direction, as a positioning process;
  a correcting unit configured to correct the pixel located at the pixel position, as a correction process;
  a zooming unit configured to control the positioning unit and the correcting unit for zooming the image data so as
    to repeatedly perform the positioning process and the correction process on a pixel line of the sub-scanning direction including the pixel located at the pixel position and
    to repeatedly perform the positioning process and the correction process, which are performed on the pixel line of the sub-scanning direction, in the main-scanning direction, as a zooming process;
  a pattern recognition unit configured to perform pattern matching on a predetermined pattern and a predetermined pixel line of the image data; and
  a pixel position changing unit configured to shift the decided pixel position in the sub-scanning direction, when the pixel line of the sub-scanning direction including the pixel of the pixel position decided by the positioning unit is identical with the pattern, wherein
  the zooming unit performs the zooming process on the pixel line of the sub-scanning direction including the pixel that is located at shifted pixel position shifted by the pixel position changing unit.

2. The image forming apparatus according to claim 1, wherein
  the pixel position changing unit shifts the decided pixel position in the sub-scanning direction when a black pixel and the target pixel are identical to each other.

3. The image forming apparatus according to claim 1, wherein
  the pixel position changing unit shifts the decided pixel position in the sub-scanning direction when a white pixel and the target pixel are identical to each other.

4. The image forming apparatus according to claim 1, wherein the pixel position changing unit shifts the decided pixel position by a predetermined fixed value in the sub-scanning direction when a predetermined pixel and the target pixel are identical to each other.

5. The image forming apparatus according to claim 1, wherein
the pixel position changing unit comprises binarizing unit that binarizes multi-valued image data as image data, and
the pattern recognition unit performs pattern matching on the pattern and a predetermined pixel line of binarized image data.

6. The image forming apparatus according to claim 1, wherein
the pixel position changing unit comprises ternarizing unit that ternarizes multi-valued image data as image data, and
the pattern recognition unit performs pattern matching on the pattern and a predetermined pixel line of ternarized image data.

7. An image forming apparatus comprising:
a pattern recognition unit configured to perform pattern matching between a predetermined pattern and a predetermined pixel line of image data consisting of a plurality of pixels;
a positioning unit configured to performs a positioning process for deciding a position of a pixel that is to be a correction target based
on a position of a main-scanning direction of a pixel that becomes a reference pixel for zooming the image data,
on a misaligned amount in a sub-scanning direction from the position of the main-scanning direction, and
on a result of the pattern matching;
a correcting unit configured to correct the pixel located at the pixel position, as a correction process; and
a zooming unit configured to control the positioning unit and the correcting unit to perform a zooming process for zooming the image data so as
to repeatedly perform the positioning process and the correction process on a pixel line of the sub-scanning direction including the pixel located at the pixel position and
to repeatedly perform the positioning process and the correction process, which are performed on the pixel line of the sub-scanning direction, in the main-scanning direction.

8. An image forming method in an image forming apparatus, the image forming method comprising:
acquiring
a misalignment amount of a pixel in a main-scanning direction and
a misalignment amount of the pixel in a sub-scanning direction from a position of the main-scanning direction,
the pixel being used as a reference pixel for zooming image data, and
the image data consiting of a plurality of pixels by a positioning unit;
deciding a position of a pixel, the pixel being a correction target, as a target pixel based
on the misalignment amount in the main-scanning direction and
on the misalignment amount in the sub-scanning direction, as a positioning process by the positioning unit;
correcting the pixel located at the pixel position, as a correction process by a correcting unit;
controlling the positioning unit and the correcting unit for zooming the image data so as
to repeatedly perform the positioning process and the correction process on a pixel line of the sub-scanning direction including the pixel located at the pixel position and
to repeatedly perform the positioning process and the correction process, which are performed on the pixel line of the sub-scanning direction, in the main-scanning direction, as a zooming process by a zooming unit;
performing pattern matching on a predetermined pattern and a predetermined pixel line of the image data by a pattern recognition unit; and
shifting the decided pixel position in the sub-scanning direction, when the pixel line of the sub-scanning direction including the pixel of the pixel position decided by the positioning unit is identical with the pattern by a pixel position changing unit, wherein
the zooming includes performing the zooming process on the pixel line of the sub-scanning direction including the pixel that is located at shifted pixel position shifted by the pixel position changing unit.

\* \* \* \* \*